US008571463B2

(12) United States Patent
Cohen et al.

(10) Patent No.: US 8,571,463 B2
(45) Date of Patent: Oct. 29, 2013

(54) SYSTEMS AND METHODS FOR COMPUTERIZED INTERACTIVE SKILL TRAINING

(75) Inventors: Martin L. Cohen, Malibu, CA (US); Edward G. Brown, Malibu, CA (US)

(73) Assignee: Breakthrough Performancetech, LLC, Los Angeles, CA (US)

(*) Notice: Subject to any disclaimer, the term of this patent is extended or adjusted under 35 U.S.C. 154(b) by 1068 days.

(21) Appl. No.: 11/669,079

(22) Filed: Jan. 30, 2007

(65) Prior Publication Data

US 2008/0182231 A1    Jul. 31, 2008

(51) Int. Cl.
*G09B 3/00* (2006.01)
*G09B 7/00* (2006.01)

(52) U.S. Cl.
USPC ........... 434/362; 434/219; 434/322; 434/323; 434/350

(58) Field of Classification Search
USPC .................. 434/350, 322, 323, 362
See application file for complete search history.

(56) References Cited

U.S. PATENT DOCUMENTS

| 4,015,344 | A | * | 4/1977 | Michaels et al. ............. 434/257 |
| 4,459,114 | A | | 7/1984 | Barwick |
| 4,493,655 | A | * | 1/1985 | Groff .......................... 434/351 |
| 4,608,601 | A | * | 8/1986 | Shreck et al. ................. 348/473 |
| 4,643,682 | A | * | 2/1987 | Migler ......................... 434/321 |
| 4,689,022 | A | * | 8/1987 | Peers et al. ................ 434/307 R |
| 4,745,468 | A | * | 5/1988 | Von Kohorn .................. 434/323 |
| 5,006,987 | A | * | 4/1991 | Harless ........................ 434/323 |
| 5,056,792 | A | | 10/1991 | Helweg-Larsen et al. |
| 5,147,205 | A | * | 9/1992 | Gross et al. ................... 434/169 |
| 5,533,110 | A | | 7/1996 | Pinard et al. |
| 5,722,418 | A | * | 3/1998 | Bro ............................... 600/545 |
| 5,980,429 | A | | 11/1999 | Nashner |
| 6,067,638 | A | | 5/2000 | Benitz et al. |
| 6,106,298 | A | | 8/2000 | Pollak |

(Continued)

FOREIGN PATENT DOCUMENTS

| GB | 2271262 A | * | 4/1994 |
| JP | 2000330464 | | 11/2000 |

(Continued)

OTHER PUBLICATIONS

PCT International Search Report and Written Opinion; PCT/US 08/50806; International Filing Date: Jan. 10, 2008; Mailed Jul. 8, 2008.

(Continued)

*Primary Examiner* — Nikolai A Gishnock
(74) *Attorney, Agent, or Firm* — Knobbe, Martens, Olson & Bear LLP

(57) ABSTRACT

The present invention is directed to interactive training, and in particular, to methods and systems for computerized interactive skill training. An example embodiment provides a method and system for providing skill training using a computerized system. The computerized system receives a selection of a first training subject. A training challenge related to the first training subject is accessed from computer readable memory. The training challenge is provided to a user via a terminal, optionally in verbal form. A first score related to the correctness and/or completeness of a verbalized challenge response provided by the user is stored in memory. A second score related to how quickly the trainee provided the verbalized challenge response is stored in memory. A third challenge score related to the confidence and/or style with which the trainee verbalized the challenge response is stored in memory.

57 Claims, 20 Drawing Sheets

(56) References Cited

U.S. PATENT DOCUMENTS

| | | | |
|---|---|---|---|
| 6,113,645 | A | 9/2000 | Benitz et al. |
| 6,125,356 | A | 9/2000 | Brockman et al. |
| 6,155,834 | A | 12/2000 | New, III |
| 6,171,112 | B1* | 1/2001 | Clark et al. .................... 434/322 |
| 6,190,287 | B1 | 2/2001 | Nashner |
| 6,236,955 | B1 | 5/2001 | Summers |
| 6,296,487 | B1 | 10/2001 | Lotecka |
| 6,319,130 | B1* | 11/2001 | Ooseki et al. ..................... 463/43 |
| 6,409,514 | B1 | 6/2002 | Bull |
| 6,514,079 | B1 | 2/2003 | McMenimen et al. |
| 6,516,300 | B1* | 2/2003 | Rakshit et al. ..................... 705/2 |
| 6,535,713 | B1 | 3/2003 | Houlihan et al. |
| 6,589,055 | B2* | 7/2003 | Osborne et al. ............... 434/219 |
| 6,632,158 | B1 | 10/2003 | Nashner |
| 6,684,027 | B1* | 1/2004 | Rosenberg .................... 386/117 |
| 6,705,869 | B2 | 3/2004 | Schwartz |
| 6,722,888 | B1 | 4/2004 | Macri et al. |
| 6,736,642 | B2 | 5/2004 | Bajer et al. |
| 6,755,659 | B2 | 6/2004 | LoSasso et al. |
| 6,909,874 | B2 | 6/2005 | Holtz et al. |
| 6,913,466 | B2* | 7/2005 | Stanfield et al. .............. 434/219 |
| 6,925,601 | B2 | 8/2005 | Moore et al. |
| 6,944,586 | B1* | 9/2005 | Harless et al. ................... 703/23 |
| 6,966,778 | B2 | 11/2005 | Macri et al. |
| 6,976,846 | B2 | 12/2005 | Dupont et al. |
| 6,988,239 | B2 | 1/2006 | Womble et al. |
| 7,016,949 | B1 | 3/2006 | Tagawa |
| 7,221,899 | B2* | 5/2007 | Ohno et al. .................... 434/350 |
| 7,367,808 | B1* | 5/2008 | Frank et al. .................... 434/219 |
| 2002/0059376 | A1 | 5/2002 | Schwartz |
| 2002/0119434 | A1 | 8/2002 | Beams et al. |
| 2003/0059750 | A1 | 3/2003 | Bindler et al. |
| 2003/0065524 | A1 | 4/2003 | Giacchetti et al. |
| 2003/0127105 | A1 | 7/2003 | Fontana |
| 2003/0180699 | A1 | 9/2003 | Resor |
| 2004/0014016 | A1 | 1/2004 | Popeck et al. |
| 2004/0018477 | A1 | 1/2004 | Olsen |
| 2004/0043362 | A1 | 3/2004 | Aughenbaugh et al. |
| 2004/0166484 | A1 | 8/2004 | Budke et al. |
| 2005/0003330 | A1* | 1/2005 | Asgarinejad et al. ........... 434/20 |
| 2005/0004789 | A1 | 1/2005 | Summers |
| 2005/0026131 | A1 | 2/2005 | Elzinga et al. |
| 2005/0054444 | A1* | 3/2005 | Okada ............................. 463/42 |
| 2005/0089834 | A1* | 4/2005 | Shapiro ........................ 434/323 |
| 2005/0170326 | A1 | 8/2005 | Koehler et al. |
| 2006/0048064 | A1* | 3/2006 | Vronay ......................... 715/764 |
| 2006/0074689 | A1 | 4/2006 | Cosatto et al. |
| 2006/0078863 | A1 | 4/2006 | Coleman et al. |
| 2006/0154225 | A1 | 7/2006 | Kim |
| 2006/0172275 | A1* | 8/2006 | Cohen ........................... 434/350 |
| 2006/0177808 | A1 | 8/2006 | Aosawa et al. |
| 2006/0204943 | A1 | 9/2006 | Kimball |
| 2007/0015121 | A1 | 1/2007 | Johnson et al. |
| 2007/0188502 | A1 | 8/2007 | Bishop |
| 2007/0245305 | A1 | 10/2007 | Anderson |
| 2007/0245505 | A1 | 10/2007 | Abfall et al. |
| 2008/0254419 | A1* | 10/2008 | Cohen ........................... 434/219 |
| 2008/0254423 | A1* | 10/2008 | Cohen ........................... 434/308 |
| 2008/0254424 | A1* | 10/2008 | Cohen ........................... 434/308 |
| 2008/0254425 | A1* | 10/2008 | Cohen ........................... 434/308 |
| 2008/0254426 | A1* | 10/2008 | Cohen ........................... 434/308 |
| 2010/0028846 | A1 | 2/2010 | Cohen et al. |

FOREIGN PATENT DOCUMENTS

| | | |
|---|---|---|
| JP | 200272843 | 3/2002 |
| JP | 200489601 | 3/2004 |
| JP | 2004240234 | 8/2004 |
| WO | WO 8505715 | 12/1985 |

OTHER PUBLICATIONS

International Search Report and Written Opinion; PCT/US08/58781, Filing date: Mar. 28, 2008; mailed Oct. 1, 2008.

PCT International Search Report and Written Opinion, PCT Application No. PCT/US2009/051994, dated Sep. 23, 2009.

PCT International Search Report and Written Opinion; PCT Application No. PCT/US08/58781, dated Oct. 1, 2008.

PCT International Search Report and Written Opinion dated Jul. 23, 2008, PCT Application No. PCT/US2006/003174.

PCT International preliminary report on patentability; PCT Application No. PCT/US2006/003174, dated: Mar. 31, 2009.

English translation of Japanese Office Action regarding Japanese Patent Application No. 2007-553313, dated Mar. 12, 2012 and transmitted on Mar. 21, 2012.

* cited by examiner

Question:
Did the trainee immediately respond or was there a significant delay, which would be unacceptable with actual Customers and Prospects?

Answer:

○ Delayed Response. (0 points)

○ Response was immediate. (1 point)

*Next*

*FIG. 3X*

Question: How confident did the trainee sound when overcoming the Challenge?

○ Not confident. (0 points)
○ Somewhat confident. (1 point)
○ Confident (2 points)

*Next*

*FIG. 3Y*

You will now hear a Model Answer incorporating all the key elements.
Take notes on any language from the Model Answer that will improve your performance.

*Click to hear Model Answer*

*FIG. 3Z*

SYSTEMS AND METHODS FOR COMPUTERIZED INTERACTIVE SKILL TRAINING

COPYRIGHT RIGHTS

A portion of the disclosure of this patent document contains material that is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

CROSS-REFERENCE TO RELATED APPLICATIONS

Not applicable.

STATEMENT REGARDING FEDERALLY SPONSORED R&D

Not applicable.

PARTIES OF JOINT RESEARCH AGREEMENT

Not applicable.

REFERENCE TO SEQUENCE LISTING, TABLE, OR COMPUTER PROGRAM LISTING

Not applicable.

BACKGROUND OF THE INVENTION

1. Field of the Invention

The present invention is directed to interactive training, and in particular, to methods and systems for computerized interactive skill training.

2. Description of the Related Art

Many conventional skill training techniques tend to train users in how to respond to test questions, typically by multiple choice, true/false, or written sentence completion, rather than providing adequate training on using those skills in a real-world environment. That is, interpersonal verbal responses Further, many conventional techniques for testing skills fail to adequately evaluate users' ability to utilize their skills in a real-world environment. That is, verbal interactions.

SUMMARY OF THE INVENTION

The present invention is directed to interactive training, and in particular, to methods and systems for computerized interactive skill training.

Certain example embodiments teach and train a user to utilize information and skills in a simulated real-world environment. For example, a user provides verbalized responses that engender relatively instant feedback. Users are optionally trained to provide information, respond to objections, and/or ask questions as appropriate, automatically or almost automatically, without undesirable pauses. Optionally, users are scored based on their retention of the information, and their ability to provide the information to others in a natural, confident manner. Thus, certain embodiments aid users in internalizing and behaviorally embedding information and skills learned during training. Furthermore, certain embodiments of performance drilling serve as a coaching and self-coaching tool.

An example embodiment provides a computerized training system comprising programmatic code stored in computer readable memory configured to: receive log-in information for a trainee and/or a facilitator; identify one or more training modules based at least in part on at least a portion of the login information; receive a selection of at least one of the identified training modules; cause the verbalization of a challenge in conjunction with a displayed human or animated person simulating a customer or prospect, wherein the challenge includes a statement or question; receive a first challenge score from the facilitator related to a verbalized trainee challenge response, wherein the first challenge score is related to the correctness and/or completeness of the challenge response; receive a second challenge score from the facilitator related to the verbalized trainee challenge response, wherein the second challenge score is related to how quickly the trainee provided the challenge response; receive a third challenge score from the facilitator related to the verbalized trainee challenge response, wherein the third challenge score is related to the confidence and/or style with which the trainee verbalized the challenge response; and randomly or pseudo-randomly select a next challenge that is to be provided to the trainee.

An example embodiment provides a computerized training system comprising programmatic code stored in computer readable memory configured to: receive a selection of at least one training subject; provide the trainee with a challenge via a simulated customer or prospect related to a product or service corresponding to the selected training subject; receive a first challenge score from a facilitator related to a verbalized trainee response, wherein the first challenge score is related to the correctness and/or completeness of the challenge response; receive a second challenge score related to the verbalized trainee response, wherein the second challenge score is related to how quickly the trainee provided the challenge response; and receive a third challenge score from the facilitator related to the verbalized trainee response, wherein the third challenge score is related to the confidence and/or style with which the trainee verbalized the challenge response.

An example embodiment provides a method of providing training using a computerized system, the method comprising: receiving at a first computerized system a selection of a first training subject; accessing from computer memory a training challenge related to the first training subject; providing via a terminal the challenge verbally to a user, wherein the challenge is intended to simulate a question or statement verbally provided by a person in a conversation; storing in computer readable memory substantially immediately after the user verbally provides a challenge response a first score related to the correctness and/or completeness of the challenge response; and storing in computer readable memory substantially immediately after the user verbally provides the challenge response a second score related to how quickly the user provided the challenge response.

An example embodiment provides a method of providing training using a computerized system, the method comprising: accessing from computer memory a training information challenge; providing via a terminal the information challenge to a user, wherein the information challenge is intended to simulate a question or statement from another person; storing in computer readable memory a first score related to the correctness and/or completeness of an information challenge response provided by the user, and a second score related to the confidence timing of the information challenge response provided by the user, wherein the first and second scores are stored substantially immediately after the user provides the information challenge response; accessing from computer memory a training challenge related to an objection; providing via a terminal the objection challenge to a user, wherein the objection challenge is intended to simulate a question or statement from the person; and storing in computer readable memory a third score related to the correctness and/or completeness of an objection challenge response provided by the user, and a fourth score related to the timing of the objection challenge response provided by the user.

An example embodiment provides a method of providing training using a computerized system, the method comprising: accessing from computer memory a training challenge related to a first training subject; providing via a terminal the challenge verbally to a user, wherein the challenge is intended to simulate a question or statement from a person to simulate a real-time conversation with the person; and storing in computer readable memory at least one of the following substantially immediately after a challenge response is provided by the user; a first score related to the correctness and/or completeness of the challenge response provided by the user; a second score related to how quickly the user provided the challenge response; a third challenge score related to the confidence and/or style with which the user verbalized the challenge response.

BRIEF DESCRIPTION OF THE DRAWINGS

Embodiments of the present invention will now be described with reference to the drawings summarized below. These drawings and the associated description are provided to illustrate example embodiments of the invention, and not to limit the scope of the invention.

DETAILED DESCRIPTION OF PREFERRED EMBODIMENTS

Figure 1:
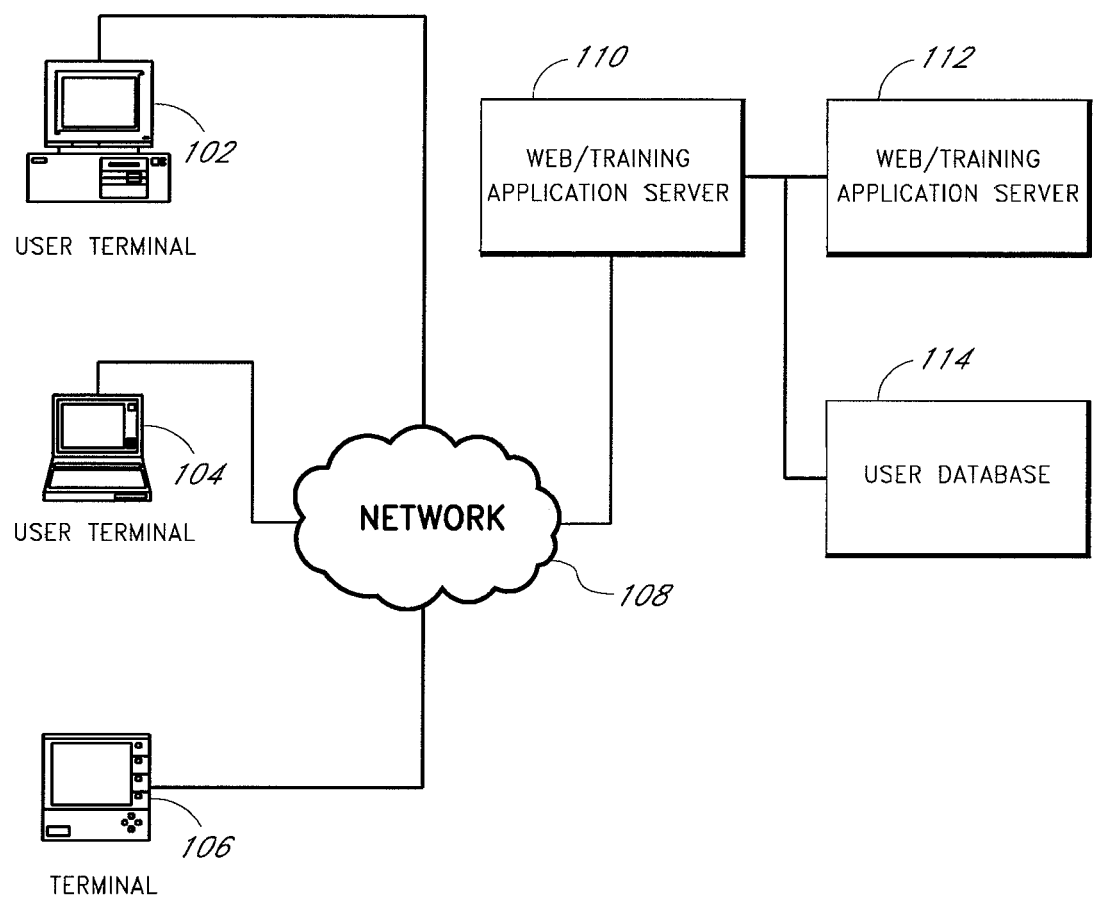
FIG. 1 illustrates an example networked system that can be used with the training system described herein.

The present invention is directed to interactive training, and in particular, to methods and systems for computerized interactive skill training. Certain embodiments also provide blended learning during the period of interactivity (e.g., computer-interaction learning with a human facilitator participating).

As discussed in greater detail below, example embodiments utilize a processor-based training system to drill and train users with respect to acquiring certain information and skills. Certain embodiments train a user to utilize the acquired information and skills in a simulated real-world environment where the user interacts with another person (real or simulated). The user is scored based on their retention of the information, and their ability to provide the information to others in a natural, confident manner (e.g., without hemming and hawing). Further, the training system optionally enables real-time or post-testing scoring of user training sessions. The scoring optionally includes sub-category scoring, consolidated category scoring and scoring which helps the user and others to help the user to focus upon areas that need significant or the greatest improvement. For example, the category can be financial transactions, and sub-categories can include saving deposits, withdrawals, debit cards, checking accounts, and credit cards. Optionally, the consolidated scoring report provides a total score, and subcategory scores report individual scores for corresponding subcategories, so the user and others can better understand the user's performance deficits at a more granular level, and can focus additional training on lower scored subcategories.

Optionally, so as not to make a user unduly nervous regarding the training process and to reduce the fear of obtaining a low score, scoring can be deleted or otherwise not retained in computer accessible memory long term (e.g., it is removed from memory when the user logs out of the training system or earlier) and is optionally not printed out in hardcopy form, and instead a report is generated and stored indicating simply that the user needs help or further training with respect to certain categories/subcategories (e.g., without making a point or grade distinction with respect to other users that also need help).

The training optionally enables a user to provide answers and information to others in real life situations with customers and prospects in a manner that instills trust and confidence with respect to the user. Thus, the training system aids users in internalizing and behaviorally embedding information and skills learned during training. Users are optionally trained to provide information, respond to objections, or ask questions, as appropriate, automatically or almost automatically, without undesirable pauses. The training system as described herein can optionally be configured and used to provide training with respect to academic knowledge, and/or other skill improvement that involves verbalization, including relationship building. Examples of categories include, but are not limited to, some or all of the following: Information (e.g., Product Information, information regarding an academic subject, information about a person, etc.), Objections (e.g., Product Objections, objections to a course of action, etc.), Generic Objections (e.g., generic objections to products or services), Service Queries, Resolving Service Problems, Dealing with Angry Customers, Dealing with Life Events (e.g., Divorce, Marriage, Birth, Death, Travel, etc.), Making Referrals to Specialists, Differentiation and Orientation Statements, Sales, Service and Relationship Technique Drilling.

In an example embodiment, a user, such as a trainee, utilizes a training terminal (e.g., a personal computer, an interactive television, a networked telephone, a personal digital assistant, an entertainment device, etc.) or other device, to access a training program stored locally or remotely in computer readable memory. The user may be requested or required to log-in (e.g., provide a password and/or user name) to access the training program and/or one or more training modules. Optionally, the training system utilizes the log-in information and/or a cookie or other file stored on the user's terminal to determine what training scenarios/modules the user has already taken and/or completed, and/or scenarios/modules so that the system can automatically select the appropriate training module for the user and store the user's interactions and/or score in a database in association with the user identifier.

A library/cataloging function provides users/facilitators the ability to precisely choose the skill training desired. Optionally, the user/facilitator can choose full categories and/or sub-categories. For example, optionally, the system can present the user (or a trainer) with a selection of modules (e.g., in the form of categories/training sequences) the user and/or facilitator selects the desired module. Optionally, a training administrator can select and specify the module to be presented to the user. Optionally, the system automatically selects which module (or segment therein) is to be presented based on the user's training history (e.g., which modules the user has completed and/or based on corresponding module training scores), the user's training authorization, and/or other criteria. The facilitator optionally acts as a coach.

Different training modules are optionally provided which drill users on specific areas within their industry/job function. For example, certain modules may be intended to prepare users for dealing with actual customer or prospect challenges. Modules may be focused on learning about products/services, comparisons of product/services (e.g., comparisons of product/services offered by the user's employer, comparisons of product/services offered by the user's employer with products/services of another company or other entity), handling customer complaints, resolving service issues, providing customers with background information on the company, etc. Modules may also be focused on academic training and/or relationship building, etc.

The following are non-limiting illustrative examples of modules in the form of challenge categories and sub-categories, which can be presented to a user via a user interface.

1. Product Knowledge
Checking accounts
Savings accounts
Credit cards
Loans
IRA accounts
Money market accounts With respect to product-related mastery training, there can be sub-sections (e.g., 1, 2, 3, or more core sub-sections) with respect to testing different aspects of knowledge for a given subject. For example, a set of sub-sections can include Product Descriptions, Product Usage and Product Objections. Product Descriptions means responding to a more general question/challenge regarding a product such as "tell me about your home equity lines of credit" or other product. Product Usage means responding to a question/challenge regarding details or specifics of a products operation or usage such as, "exactly how does a home equity loan work?, Are there any fees when I use the account, are there any minimum credit balances I must maintain, what are the yearly fees if any?", etc. Product Objections are those objections and/or resistances expressed by customers and/or prospects regarding a specific product (or service) (e.g., "I don't see the need to get a platinum credit card when a gold or regular credit card will do", "I won't pay a monthly fee to use checks"). This is distinct from Generic Objections, which are objections and/or resistances that would apply generally to products/services and/or situations (e.g., "I am not interested", "I don't have time", "I don't have the money," "I don't like your organization", etc.). In an example embodiment, Generic Objections are a separate performance drilling section.

Optionally, a user and/or facilitator can limit a training session to one sub-section for one or more products, or the user and/or facilitator can drill down/navigate to other subsections. For example, randomized challenges presented during a training session can be limited to Product Descriptions and/or optionally there can be integrated product-related mastery training across several or all subsections for a product, such as Product Descriptions, Product Usage, and Product Objections. Optionally, the training is performed in a specified subsection sequence (e.g., first Product Descriptions, second Product Usage, and third Product Objections), or the training can include randomized challenges across the multiple subsections. Optionally, even when there is randomized drilling in a specific subsection (e.g., Product Description), there can be automated links that can be activated by the user and/or facilitator so as to drill down to other subsections (e.g., Product Usage challenges and Product Objection challenges).

As similarly discuss above, challenges can relate to comparisons, such as comparisons of product/services, people, places, etc. By way of illustration, the comparisons can include comparisons of products/services offered by the user's employer, comparisons of products/services offered by the user's employer with products/services of another company or other entity, and/or products and services of two or more other entities other than the user's employer. For example, a challenge can be a question regarding two different products or services, such as:

"What is the difference between a credit card and a debit card?"

"How does an adjustable rate mortgage loan compare with a fixed rate mortgage loan?"

"How does your higher price vacuum cleaner compare with your economy model?"

"How does the sports version of this car compare with the standard version?"

"How does your product compare with that of your competitors?"

"Why is your product more expensive than that of your competitor?"

"How does the service compare at the following three hotel chains?"

Optionally, if the user scores at least a predetermined or other threshold (e.g., "four out of five" "two out of three", "eight out of nine" or other threshold) with respect to a certain score (e.g., a key elements score, explained in greater detail below), then an automatic linkage is provided to another category (e.g., the Product/Service Usage category) so that the linked to category will next be tested. Likewise, if the user score meets a certain threshold (e.g., "four out of five") in the Product/Service Usage category, there would be an automatic linkage to still another category (e.g., the Product/Service Objections category). Optionally, if the user fails to meet a designated threshold, additional and/or repeated challenges within the current category are presented to further drill the user in the current category until the user's score improves to meet the threshold (or another specified threshold).

Optionally, if the user did not score at least a specified threshold (e.g., "four out of five") in a category, the user needs to repeat the category drilling until the user scores the specified threshold before they are able to proceed to the next category.

2. Dealing with Angry Customers/Customer Complaints
Waiving fees or service charges
Offering upgraded service
Closing accounts 3. Resolving Service Problems 4. Background on the Company Before presenting the actual training user interfaces, the system optionally provides text, audio, and/or video instructions to the user that explain the purpose of the selected training module, how the user is to interact with the training program, the scoring process, and/or other information.

Optionally, a trainer/facilitator is online and/or present when the user/trainee is undergoing training via the system. For example, the trainer may be sitting alongside the trainee, looking at the same terminal screen and/or the trainer may be viewing the screen of a separate trainer terminal which presents similar or the same user interfaces as viewed by the trainee, optionally with additional trainer information (e.g., training answers). Optionally, the trainer provides the trainee with instructions on how to utilize the training system and/or provides real time or delayed scoring of the trainee's training session, as described in greater detail below.

In this example, the system presents a user interface to the trainee that informs the trainee regarding the subject matter of the training session. For example, the system can be used to train a sales and/or service person in a particular industry (e.g., banking, finance, travel agency, automobile sales person, telephony, utilities, etc), train a person on how to relate in a personal situation (e.g., with a spouse, child, sibling, parent, girlfriend/boyfriend, etc.), train a person with respect to academic knowledge, or for other purposes.

Thus, by way of illustration, a trainee may be informed that the training session provides training with respect to credit cards for minors. By way of further illustration, the training may be intended to train a user in how to respond to a more open-ended question. For example, a question or comment may relate to a customer's or prospect's marital status, health, a trip, a residence, and/or a child. The system can train the trainee how to respond to such questions or comments, which can take the following example forms:

"I am getting a divorce (or other life event), what should I do?";

"I am getting married this summer and a need a loan to pay for the wedding";

"We are planning to take a cruise, do you have any recommendations on how to finance it?";

"We are planning to remodel our house, what type of loans do you offer?";

"How should we be saving money for our child's future education?"

The training optionally trains the user to overcome objections to a course of action proposed by the trainee to a customer/prospect. By way of still further example, the training may be intended to train the user in how to handle a customer that comes in with a service complaint (e.g., "The product does not work as described" or "Why weren't my funds transferred as instructed?").

The training system optionally provides academic training related to subject matter taught in an a school or employer classroom setting, or otherwise (e.g. "Who are the first five Presidents of the United States; "List, in order, the 10 steps that need to be taken in order to approve a loan request"; "Who should you first attempt to contact in the event there has been a work accident", etc.). By way of further example, the training can be related to math, history, English, a foreign language, computer science, engineering, medicine, psychology, proper procedures at a place of employment, etc. Thus, for example, the training is not necessarily related to interaction with or challenges from another person, such as a customer, prospect, or family member. The academic training can be used to reinforce training previously provided to the trainee.

In this example, the trainee is also informed of the different stages of a training session. For example, the trainee is informed that pre-study screens (also referred to as user interfaces) will be available, wherein the trainee is provided with key or other elements that the trainee will be expected to know and utilize during the "tested" portion of training session. The trainee is further informed that after the pre-study screen(s), the tested portion will begin. The pre-study screens/user interfaces optionally include text, an audible verbalization of the text, and/or a video or animated figure synchronized with the verbalization.

The pre-study screen(s) is intended to familiarize the trainee with the elements and optionally, only the key elements that are to be tested to educate the trainee and/or so that the trainee will not feel that they are unfairly tested. The training will be in the form of challenges that the trainee is asked to respond to. To overcome or successfully respond to these challenges, there are certain elements (e.g., key elements) that the trainee has to state. The pre-study screen(s) will provide the trainee with the key elements necessary in responding to the challenges. In an example embodiment, clients (e.g., employers of trainees) have the option of deciding on the key elements the trainees should be tested upon and/or the operators/creators of the training system will make these decisions. This enables expectations to be aligned with the training being provided to users.

Optionally, the pre-study screens may be automatically or manually (e.g., by the trainer, user, and/or a system operator) turned off for one or more training sessions for a given user. For example, if the user has already viewed a given pre-study screen, a bypass control (e.g., a button or link) is optionally provided on the trainee and/or trainer user interface prior to displaying the pre-study screen(s), which, when activated causes the pre-study screen(s) to be skipped. A facilitator may elect to activate the by-pass button because the user should already know what the pre-study key elements are based upon prior training.

There may be other reasons for bypassing or not presenting a pre-study screen. For example, not presenting the pre-study screen(s) provides advanced real-world "stress testing", where when dealing with a person/persons who verbalize a challenge, the recipient of the challenge typically does not have an opportunity to refer to "Pre-Study" materials. Not presenting the pre-study screen (e.g., at pre-determined times or randomly) can be part of a "surprise attack" performance drilling session, which makes the drilling more exciting, and keeps a trainee more alert. In addition, turning of the pre-study screen(s) prior to a scored session enables the system to "pre-test" users' knowledge base before they are able to observe pre-study key element screens. Thus, turning off pre-study screens can serve as a motivator to the user if their score is sub-par, as well as to establish performance baselines. The performance baseline scoring can be compared with scoring after the user has viewed the pre-study screens to provide the user/trainer/company with "before and after" evidence of progress.

Optionally, a time limit may be set on how long the user can view/study a given pre-study screen and/or a set of pre-study screens. A timer (e.g., a count down timer, a color-coded timer (green, yellow, red) or other timer) may be displayed to the user and/or trainer showing how much time is left when a pre-study screen and/or individual limit is presented. This can serve too provide the user with a brief reminder of the key elements which they should have already pre-studied, but not to give them unlimited time to actually learn the key elements from scratch, which they should have already studied and learned. In addition, this serves to limit the time the user spends on the entire module, so that the user does not take "20 minutes" (or other excessive period of time) to complete a module which should have been completed in eight minutes (or other period of time).

Optionally, the ability to achieve the above is on a "key element by key element basis". That is, as each key element screen is "brought up", it can only be viewed for a limited period of time before the next key element screen is brought up, and so on. The rate at which the key elements are presented is optionally pre-set or set during the session by the facilitator.

Optionally, the above can be achieved by screens proceeding automatically to the next screen and/or screens "fading to black" at a set time period (e.g., pre-set or set during the session by the facilitator) and then having the next screen automatically coming up, etc.

For example, with respect to product descriptions and product usage, there may be five key elements for product descriptions and five key elements for product usage, but many more elements, benefits and features listed based upon a company's brochures, Web sites and other product informational sources, let alone internal communications.

Optionally, because of the digital nature of the information "reservoirs", the system enables a company to alter/adapt/change key elements based upon real world realities. For example, if it is discovered that the five existing key elements to answering a particular challenge are not as effective as a different set of key elements in the real world (even a change in a single key element), then the key elements for this particular objection are changed accordingly to match experiential realities.

It may be advantageous in certain instances to emphasize or only train users with respect to certain more important elements (e.g., key elements) as it is recognized that most users will only be able to memorize verbalizations for a limited number of elements, and receivers of information will only be able to process a limited number of elements/messages. Notwithstanding the foregoing, other elements may optionally be mentioned on the pre-study screens.

The pre-study elements (e.g., the key elements) for a category are optionally packaged or presented together so as to better train the trainee to respond to randomized challenges which better mimic real world situations. Additionally, certain elements (e.g., key elements), are kept focused (e.g., unitary, short) to enhance objective scoring and reduce subjective scoring. The key elements may optionally be role modeled, verbalized, with the text of the key elements appearing as they are verbalized, for cognitive and behavioral embedding purposes. The text super-impositions are optionally highlighted as they are displayed.

Optionally, in the pre-study screen(s), there will be related elements that are not as essential as the key elements. Optionally, trainees will be instructed or advised to study these related elements and may be provided extra credit for identifying these when responding to the challenges. The pre-study screen(s) are optionally consolidated to contain the key elements related to various challenges within the same category or module. Optionally, printing of the pre-study screens (e.g., a listing of the elements) is permitted, while the printing of certain other user interfaces (e.g., the challenge user interfaces and/or the model answer user interfaces) is inhibited.

Optionally, different challenges are repeated different numbers of times. Optionally, the selection of the challenges to be repeated and/or the repeat rate are purposely random or pseudo random to mimic the real world experience and to prevent rote memorization. Optionally, the more significant elements are weighted (e.g., by a person crafting the training) so that the more significant elements are or tend to be repeated more often than those elements that are considered less significant. The weightings can be stored in computer readable memory and optionally automatically applied by the system. Optionally, the trainer can manually instruct, via a user interface control, that one or more select challenges are to be repeated (e.g., in a non-randomized fashion).

By way of example, the challenges may include one or more of the following elements and/or other elements:

facts regarding the subject matter at hand that the trainee will be expected to know and provide to a customer/prospect;

questions the trainee will be expected to ask of a simulated person (e.g., of a customer/prospect, wherein the trainee is a customer service person, in order to determine that customer's needs and/or wants);

social conversation intended to put another person at ease and/or to establish a sense of trust.

The challenges may be presented as displayed text, as part of a role playing scenario (e.g., where the user is presented with a scenario involving an animation or person playing an appropriate role, which presents the opportunity for the trainee to state/provide the elements), with the elements presented audibly, textually (optionally in an overlay over the video portion), and/or otherwise.

The elements may be those considered by the trainee's management to be more significant or key so that the trainee is not overly burdened with having to remember all related elements (which can optionally be accessed instead during a real-life interaction via a computer or otherwise, after the trainee has built credibility and trust with an actual customer or prospect, wherein the credibility and trust is the result, at least in part of the trainee's ability to respond without having to read from a list, manual, brochure, etc).

Optionally, the trainee's management or other authorized personnel can specify, select, or modify the elements as desired. By optionally placing the burden on the trainee's management/employer to identify the more significant elements, they are encouraged to better understand and identify what is expected from employees performing a given job function.

Once the pre-training session has been completed, the trainee is informed that the tested portion of the training session is about to begin. The test portion includes a scene having one or more people (real or animated) playing an appropriate role, such as that of a customer, prospect, a family member, or other person as appropriate for the skill being trained. The actors playing the roles can read a script relevant to the field and skill being trained.

The script includes "challenges" (e.g., questions, statements, or information) randomly or pseudo randomly presented, or presented in a predetermined order to the trainee. The challenges are optionally verbalized and/or acted out by a real or animated person/actor. The person or people in the scene may or may not be lipped-synced to a verbalization of the script. The person or people in the scene may be of different ethnicities as selected by the employer, the facilitator, the training system provider, or other entity. The speech patterns and/or accents of the person or people in the scene may be selected by the employer, the facilitator, the training system provider or other entity. The foregoing selection may be made from a menu presented on a terminal (e.g., a menu listing one or more ethnicities and/or accents) and stored in memory.

The trainee is expected to respond with the appropriate element(s) taught during the pre-training session. Optionally, a timer (e.g., a countdown timer) is displayed to the trainee when a challenge is provided. In an example embodiment, the trainee provides the response verbally, but may also do so by typing/writing in the response, by selecting the response from a multiple choice offering, or otherwise. The system automatically and/or in response to a trainer instruction, presented the correct answer to the trainer.

The trainee will then be graded/scored based on one or more of the following elements. The appropriateness/correctness of the element provided by the trainee, the trainee's confidence and/or style when providing the element, and/or the naturalness and/or speed with which the trainee provides the element or any combination thereof. Thus, in an example embodiment, a trainee that provides an appropriate element, but that was too slow or too fast in providing the appropriate element so that it would appear to a real customer as being unnatural, and/or appeared to be/sounded nervous when providing that element, will not receive a "perfect" score for that element. In addition, optionally the trainee will be graded on how closely the text of the element(s) recited by the trainee matches that provided to the trainee on the answer screens, which matches the key elements on the pre-study screens.

Optionally, a countdown timer is set to a certain value during a challenge response period and the trainee has to provide the challenge response before the timer reaches a certain point (e.g., 0 seconds). The current countdown time can be displayed to trainee in a "seconds" format, and/or in other formats related to how much time is remaining (e.g., green for a first amount of time, yellow for a second amount of time, and red for a third amount of time). Optionally, the trainee's score is based on the timer value at the time the trainee provided the response. Optionally, a potential score is displayed which is decremented as the timer counts down, and the trainee is assigned the score displayed when the trainee provides the response. Optionally, a system operator and/or the facilitator can set the initial countdown time and/or the rate of the score reduction. Optionally, the facilitator can reset or change the timer value in real-time or otherwise.

Optionally, key elements for correct answers will be in the "correct order/sequence". That is, what the client and/or training implementer believes or has identified as the preferred presentation sequence. Optionally, the user is graded on the correctness of the sequence of their answer as well.

By way of illustration, if a bank employee is being trained to recommend appropriate banking services, an actor (real or simulated) may play a bank customer or prospect. The trainee observes the scene, and recites the appropriate element(s) at the appropriate time in response to questions asked by or information offered by the bank customer or prospect which may relate to banking services. For example, if the trainee is being trained to recommend and/or offer information regarding a checking account for minors, the actor may ask questions regarding why a minor needs a checking account, the costs associated with a checking account, and the risks associated with a minor having a checking account. The trainee is expected to respond to the customer questions/information with the element(s) (e.g., the key elements) taught during the pre-training session. Optionally, the trainee is not permitted to refer to notes or other materials (e.g., printed materials, such as books or course handouts) during the testing phase. The trainee's response may be observed (e.g., listened to and/or viewed) in substantially real-time by the trainer. Optionally, the trainee's response is recorded (e.g., a video and/or audio recording) by the terminal or other system for later playback by a trainer and/or the trainee, and/or for later scoring.

Optionally, embedded or otherwise associated with the audio track and/or video track of the scene is computer-readable digital metadata that identifies where/when a challenge occurs in the track, what the challenge is, and/or the element that the trainee is to provide. While the trainer is observing the trainee (in real time or later via a recording), the correct elements are automatically (or optionally in response to a trainer or trainee action) presented to the trainer, optionally using the same text as presented to the trainee during the pre-training phase. For example, the trainer terminal can present the same scene being observed by the trainee, wherein an indication is provided to the trainer as to when the trainee is to provide an element, and the system presents the correct element via a textual overlay with respect to the scene. This enables the trainer to efficiently score the trainee based on the element (if any) provided by the trainee. In addition, the trainer may score the confidence and naturalness/timing with which the trainee provided the element, as similarly discussed above.

The score may be entered by the trainer into a scoring field presented via the trainer terminal. In an example embodiment, the scores are entered and stored in computer memory substantially immediately after the trainee provides a verbal challenge response (e.g., within 15 second, 30 seconds, or 60 seconds). Optionally, several scoring fields are provided so that the trainer can enter scores for different aspects of the trainee's provision of the element. For example, there may be a "correct element" field, a "level of confidence" field, a "naturalness of response" field, and/or a "timing of response" field. Optionally, the field may enable the trainer to enter (or select) a number score (e.g., 1-5), a letter score (e.g., A-F), a phrase (e.g., excellent, good, fair, poor), or other score. Optionally, scoring icons (e.g., circular scoring icons) are provided on the answer screens. The facilitator will click on a scoring icon to provide the trainee a point (or other score) for identifying a key element. When the facilitator clicks on a scoring icon, the icon, originally white, will turn green to signify the user has correctly identified a key element. Other colors/indicators can be used as well. If the facilitator clicks on these scoring icons in error, they have the option of re-clicking on the scoring icon(s) (or otherwise correcting the scoring error). This will return the icon to white and no points will be calculated.

Optionally, the system automatically scores one or more aspects of the trainee's performance. For example, the system can detect (e.g., via sound received via a microphone coupled to the trainee terminal, wherein input received via the microphone is translated into a digital value) how long it takes the trainee to begin providing an element after a "challenge" (as identified to the training system via the metadata discussed above), and score the speed of the trainee's response and/or provide the actual elapsed time between the challenge and the trainee's response and/or present the elapsed time to the trainer. The scoring of the immediacy of response and confidence, rather than solely providing a blended score of the two, aids the user/trainer in better understanding more precisely the precise learning and performance deficits of the trainee. The trainer can also provide textual/verbal comments (or optionally select predefined comments presented to the trainer via a user interface) regarding the trainees confidence and the naturalness of the trainees response. For example, the trainer's user interface can include a text field via which the trainer can enter comments.

Optionally the scores for two or more aspects of trainee's provision of an element (which will sometimes be referred to as an "answer") may be combined into a single score (e.g., as an average score, which is optionally weighted). For example, if the trainee received a score of 5 for appropriateness/correctness of the element a score of 3 for the trainee's confidence, and a score of 2 for the trainee's naturalness, an average score of 3.33 may be calculated and assigned to the trainee's answer. Different aspects of the trainee's provision of an element can be assigned corresponding different weightings. By way of example, the combined score can be calculated using the following weighted average formula (although other formulas may be used as well).

$$\text{TotalMaximumScore}((W_1 \text{Score}_1/\text{MaximumPossible}_1) + \ldots W_{n-1}(\text{Score}_{n-1}/\text{MaximumPossible}_{n-1}) + W_n(\text{Score}_n/\text{MaximumPossible}_n))$$

Where TotalMaximumScore is the maximum score that can be awarded for the answer, W is the weighting for a corresponding aspect of the answer, Score is the score awarded for a corresponding aspect, and MaximumPossible is the maximum possible score that can be assigned for the corresponding aspect.

For example, using the above formula, if the correctness of the trainee's answer is assigned a weighting of 0.5, and confidence and naturalness are each assigned a weighting of 0.25, then if the trainee received a score of 5 out of 5 for appropriateness/correctness of the element, a score of 3 out of 5 for the trainee's confidence, and a score of 2 out of 5 for the trainee's naturalness, the system calculates and assigns to a the trainee's answer a score of 3.75 out of a maximum of 5.

A total score can be assigned for multiple answers provided by the trainee using an average, a weighted average, or other calculation based on the scores received for individual answers and/or aspects thereof. Optionally, the score for a given answer and the current total is automatically calculated in substantially real time as the trainee submits answers (or fails to submit answers), with the running total displayed via the trainer terminal and/or the trainee terminal. Optionally, at the end of a training session, the training system provides the scores to the trainer and/or the trainee via an electronic and/or hardcopy report generated by the system.

Optionally, scoring can be by each sub-category or for a total category. If for a total category, a final combined score from sub-categories is presented (e.g., automatically presented or in response to a trainer command).

Optionally, a best to worst rank order scoring (or worst to best rank order scoring) by sub-categories will be presented. This will allow the user/facilitator to know where to focus subsequent training based upon strengths and weaknesses. Optionally, the specific sub-category that should be studied/repeated is displayed. Optionally, the user/facilitator can limit the scoring report so that only the scores for those sub-categories that the user needs further training on (e.g., as determined by the system based on the failure of the user to score at least a certain specified threshold) are reported to the user/facilitator.

Optionally, during the tested portion of the training session, different challenges will be repeated a different number of times. Optionally, the selection of the challenges to be repeated and/or the repeat rate are random or pseudo random. Optionally, the more significant or otherwise selected challenges are weighted so that they are or tend to be repeated more often than those challenges that are considered less significant. This weighting promotes the testing of more significant and/or more difficult to acquire skills/information.

Optionally, after the trainee has provided an answer (e.g., after the answer has been scored and/or after the trainee has completed a module or tested training portion thereof), the trainee is presented with a model answer, with the corresponding element displayed and/or verbalized. When verbalized, optionally the verbalization is provided with a confident sounding voice that the user should emulate. Optionally, the key elements provided in the answers are bolded, highlighted, underlined, or otherwise visually emphasized as compared to the sentence/phrase structure in which they are incorporated. The key elements provided in the model answer are optionally role modeled, verbalized, with the text of the key elements appearing in a super-imposed manner as they are verbalized, for cognitive and behavioral embedding purposes. The text super-impositions are optionally highlighted as they are displayed.

Optionally, the model answer is automatically presented and/or is presented in response to a trainee instruction (e.g., issued via a user interface presented via the trainee terminal). Optionally, first the element is displayed, and then the model answer is provided (e.g., textually and/or verbalized) with the element still displayed. Where there is more than one element, optionally the elements are introduced one at a time, until all the relevant elements are displayed. The revealed elements correspond to the model answer. Optionally, the trainee can take notes while the element and model answer are presented.

Optionally, a "notes" field is presented on the trainee terminal wherein the trainee can enter notes, which will then be saved in computer memory. The notes can optionally be printed and/or later accessed by the trainee. Optionally, via a user interface control, the trainer can instruct the system to repeat a selected challenge or module. Optionally, the training system automatically repeats the challenge and/or module if the trainee's score falls below a threshold defined by the system, the trainer, the trainee's employer, the trainee and/or other designated person. For example, optionally a challenge and/or module is repeated if the trainee received less than a perfect score to thereby better drill the trainee to be able to provide correct answers that include the appropriate significant elements, without hesitation and in a confident manner.

Optionally, during a training session, the system automatically presents the trainee with one or more challenges that the trainee had successfully mastered (e.g., as determined by the trainee's score) in one or more previous training sessions. Such "surprise drilling sections" help test and reinforce the trainee's retention of information and skills obtained during training.

Optionally, a training session can be presented in the form of a game to help keep the trainee's interest and/or to enhance the training impact. For example, when the trainee receives a score above a specified threshold, something pleasing happens (e.g., a certain tune is played, a certain image/video is displayed, a piece of an electronic puzzle is awarded, the trainee earns points/weapons/attributes that can be used in an electronic game, etc.). Optionally, the training can be presented in a format wherein the trainee must answer questions correctly (e.g., receive a predetermined score) in order to defeat an adversary (e.g., a simulated robot or alien). Optionally, there can be multiple players participating in a game, where if the first to answer is incorrect, then others have the chance to answer and score.

Optionally, a user's verbalized responses are recorded by hitting a "record" button. These recorded responses are immediately (or in a delayed fashion) played back via a playback button. The objective in this example embodiment is to provide the user with substantially instant feedback about how the user sounds from a style and/or attitude perspective. Optionally, substantially immediately after the playback, the facilitator/trainer asks questions of the user regarding the user's perception of the user's style and/or attitude. Examples of these questions are:

How do you think you sounded?;
Do you think you can across as confident and knowledgeable?
Would you have been convinced by your response as a customer or prospect?;
How could you have improved?, etc.

Optionally, once the playback of the user's recorded segment is complete, there can be an automatic default to the questions which are "asked" by the training system. That is, the questions are verbalized by a pre-recorded or synthesized voice at substantially the same time as text is displayed. Optionally, each question is "asked" separately. Optionally, two or more questions are asked together. After the response and/or discussion between the user and facilitator, the user/facilitator presses a "proceed" button (or other corresponding control) and the next question is asked, and so on.

Optionally, there is an option for re-recording a user response without saving the initial recorded segment via a control on the trainee and/or facilitator user interface.

Optionally, via a control on the trainee and/or facilitator user interface (e.g., a save recording icon that can be activated by the trainee and/or facilitator), there is an option for saving the recording as a "self-referenced role model" which the user and/or facilitator can later access as an example of a good response.

Optionally, there can be standard questions (e.g., 1, 2, 3, 4, 5, or more questions) with respect to the self-recording option, or these questions can be customized. For example, in order to remove the burden from the facilitator, once the user hears herself, and the system queries the user regarding the user's performance, the same questions can be asked each time (e.g., "How do you think you sounded?", "How could you improve your response?", etc.) or the system instead can ask different questions for different types of challenges. (e.g., for an objection, the system could ask "Do you feel you have overcome the customer's objections?").

Example embodiments will now be described with reference to the figures. Throughout the following description, the term "Web site" is used to refer to a user-accessible network site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically distributed computer systems that are appropriately linked together. Furthermore, while the following description relates to an embodiment utilizing the Internet and related protocols, other networks, such as networks of interactive televisions or of telephones, and other protocols may be used as well.

In addition, unless otherwise indicated, the functions described herein are preferably performed by executable code and instructions stored in computer readable memory and running on one or more general-purpose computers. However, the present invention can also be implemented using special purpose computers, other processor based systems, state machines, and/or hardwired electronic circuits. Further, with respect to the example processes described herein, not all the process states need to be reached, nor do the states have to be performed in the illustrated order. Further, certain process states that are described as being serially performed can be performed in parallel.

Similarly, while the following examples may refer to a user's personal computer system or terminal, other terminals, including other computer or electronic systems, can be used as well, such as, without limitation, an interactive television, a networked-enabled personal digital assistant (PDA), other IP (Internet Protocol) device, a cellular telephone or other wireless terminal, a networked game console, a networked MP3 or other audio device, a networked entertainment device, and so on.

Further, while the following description may refer to a user pressing or clicking a key, button, or mouse to provide a user input or response, the user input can also be provided using other apparatus and techniques, such as, without limitation, voice input, touch screen input, light pen input, touch pad input, and so on. Similarly, while the following description may refer to certain messages or questions being presented visually to a user via a computer screen, the messages or questions can be provided using other techniques, such as via audible or spoken prompts.

One example embodiment utilizes a computerized training system to enhance a trainee's listening comprehension. For example, the training can be delivered via a terminal, such as a stand-alone personal computer. The training program may be loaded into the personal computer via a computer readable medium, such as a CD ROM, DVD, magnetic media, solid state memory, or otherwise, or downloaded over a network to the personal computer.

By way of further example, the training program can be hosted on a server and interact with the user over a network, such as the Internet or a private network, via a client computer system or other terminal. For example, the client system can be a personal computer, a computer terminal, a networked television, a personal digital assistant, a wireless phone, an interactive personal media player, or other entertainment system. A browser or other user interface on the client system can be utilized to access the server, to present training media, and to receive user inputs.

As will be described in greater detail below, in one embodiment, a training system presents a scenario to a user via a terminal, such as a personal computer or interactive television. The scenario can be a pre-recorded audio and/or video scenario including one or more segments. The scenario can involve a single actor or multiple actors (e.g., a human actor or an animated character) reading a script relevant to the field and skill being trained. For example, the actors may be simulating an interaction between a bank teller or loan officer and a customer. By way of further example, the simulated interaction can instead be for in-person and phone sales or communications. By way of still further example, the actors may be simulating an interaction between a parent and a child. Optionally, rather than using actors to read a script, the pre-recorded scenario can involve a real-life unscripted interaction.

FIG. 1 illustrates an example networked training system including a Web/application server 110, used to host the training application program and serve Web pages, a scenario database 112, that stores prerecorded scenario segments, and a user database 114 that stores user identifiers, passwords, training routines for corresponding users (which can specify which training categories/scenarios are to be presented to a given user and in what order), training scores, recordings of training sessions, and user responses provided during training sessions. The training system is coupled to one or more trainee user terminals 102, 104, and a trainer terminal 106 via a network 108, which can be the Internet or other network.

Figure 2:
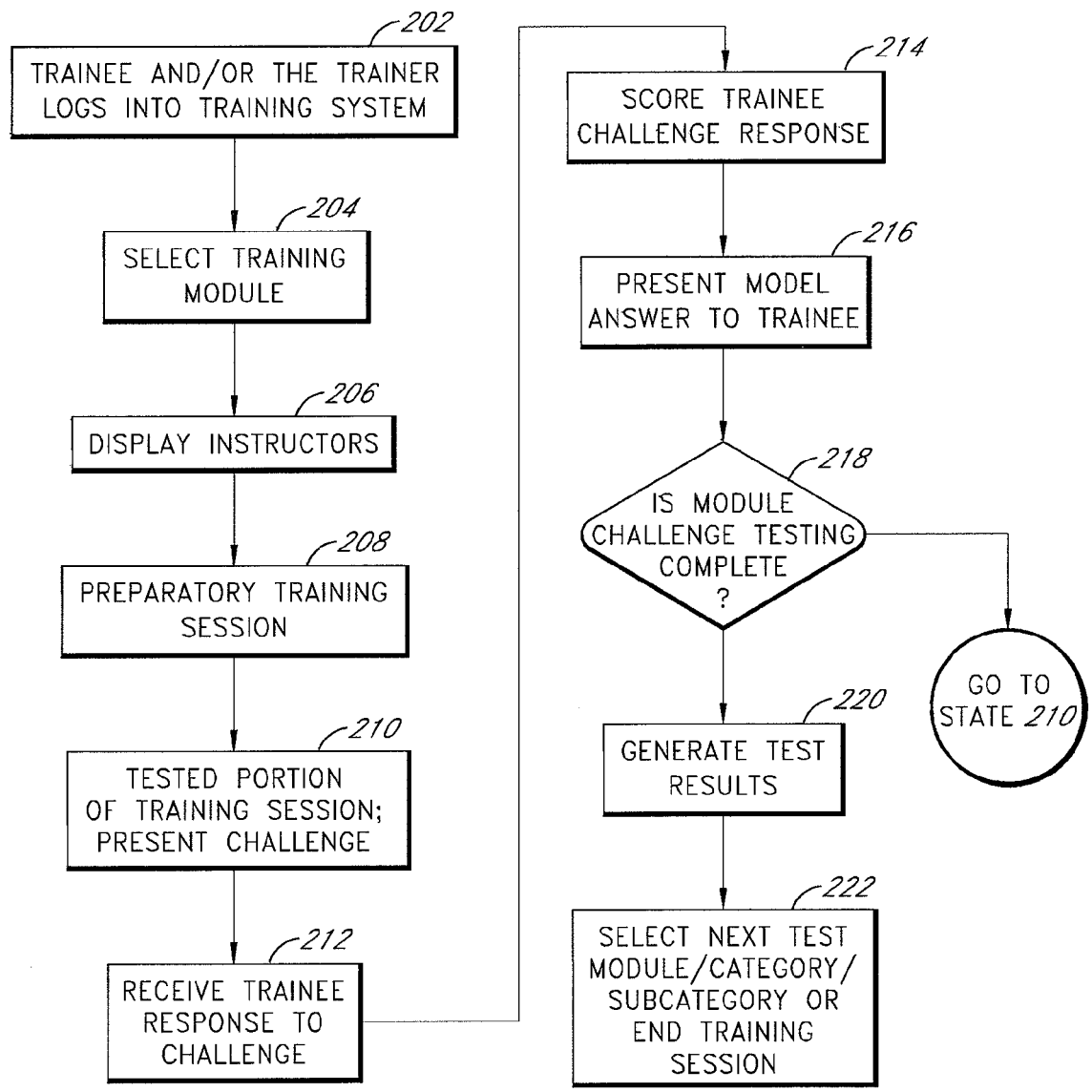
FIG. 2 illustrates an example process flow.

FIG. 2 illustrates an example training process. At state 202, the trainee and/or the trainer logs in to the training system via a training terminal. The training system can utilize the log-in information to access account information for the trainee and/or trainer. The account information optionally includes an identification of the training categories/modules that the trainee and/or trainer are authorized to access. At state 204, a training module is selected. For example, a training category/module can be selected by the trainee or the trainer from a menu of modules presented on the training terminal, wherein the menu includes modules that the trainee/trainer are authorized to access. Optionally, the system automatically selects the module based on the trainee's training history (e.g., the modules that the trainee has previously utilized and/or the trainee's scores).

At state 206, instructions regarding the use of the training system are displayed to the trainee and/or trainer. At state 208, in response to a trainee or trainer command, a preparatory training session begins. The preparatory training session presents information, questions, statements, and the like (sometimes referred to herein generally as materials), related to the training subject, where the trainee is expected to utilize some or all of the presented materials during the subsequent testing session.

At state 210, in response to a trainee or trainer command, the tested portion of the training begins. The trainee is presented with a scenario related to the materials taught during the preparatory portion of the training. The scenario will include one or more challenges by an actor pretending to be a customer, prospect, or other person relevant to the training subject. The scenario may provide via a video recording of a person or animation (e.g., a FLASH animation). By way of example, the challenges can be in form of a question (e.g., a question about a product or service, a question asking advice regarding a relevant matter, etc.) or a statement (e.g., a statement regarding the customer's current condition or plans, or regarding a product or service).

At state 212, the trainee provides an answer in response to the challenge. At state 214, the trainer and/or the training system score the answer. The correct elements are displayed to the trainer with corresponding scoring icons (e.g., circular scoring icons, or other desired shape) that the trainer can use to score the user. The answer may be scored on the correctness of the answer, the quickness with which the answer was given, the naturalness of the answer, and/or the confidence and style in which the answer is given. At state 216, the model answer is presented via multimedia (e.g., optionally audibly optionally in conjunction with the video portion of the scenario) to the trainee on the training terminal, optionally with the corresponding materials presented textually. The elements of the material may be presented in overlay format over the module scenario video/animation.

At state 218, a determination is made as to whether the testing portion of the training session has been completed. If not, the process proceeds to state 210, and the next scenario is presented. The next scenario can be randomly or pseudo-randomly selected, or the system optionally may enable the trainer and/or trainee to select the next scenario. The next scenario is optionally a repeat of a previously presented scenario (e.g., from the current module or from another module). The next scenario is optionally selected based on the trainee's score on a previous scenario.

If, at state 218, a determination is made that the testing portion of the module has been completed, the process proceeds to state 220, and a test report is generated optionally including the scores for each challenge, a total score for each challenge, and/or a total score for the module. At state 222, the process ends or the trainee/trainer selects another module.

Example user interfaces will now be described. An example user interface can provide an introduction to the training system, including instructions on how to access training system drill categories. A link to a log in page is optionally provided and the user is instructed to log into the system and choose a training module with the corresponding desired category and sub-category of drilling. A user interface is provided via which the user or facilitator has the option of clicking on an "Access Pre-Study Screen" icon. The Pre-Study user interface contains important or key elements the user needs to know in order to correctly answer the upcoming challenges. Optionally, the user can skip the pre-study user interface (e.g., if the user is already familiar with the category and sub-category and/or does not feel the need to view the pre-study user interface) by clicking a "Skip Pre-Study & Hear Challenge" icon or the like.

The user is further informed that when the simulated character stops the user is to provide a first person answer/response to the challenge, and that the correct answers are based upon the elements (e.g., the key elements provided via the pre-study user interface) chosen by the user's company or by the creators of the training system. The user is informed that when the user stops verbalization of the challenge response, the user or the facilitator should click on an "Answer" icon to obtain the correct answer(s). In an example embodiment, the user is informed that the training system will now have a simulated figure verbalize a "challenge" (e.g., a statement or question). The user then responds to the challenge.

The system can now display elements (e.g., the key elements) of the guideline correct answer, which matches or substantially matches what they have learned in previous training and/or from the Pre-Study screen(s). The answer user interfaces can display the elements and/or scores to the user/facilitator jointly, or the facilitator alone. The scoring can include a score for the elements recited by the user, a score of immediacy of response, and a score for confidence and style Optionally, a user interface is provided where the user/facilitator can instruct the system via a control (e.g., "Click to hear Model Answer" icon) to verbalize the model answer with the key elements graphically super-imposed on the screen. The elements (e.g., the key elements) are super-imposed and build up one at a time to display the elements previously revealed on the Pre-Study Screen(s). The revealing of each of these elements correlates with the verbalized Model Answer. Optionally, a control is provided via which the user/facilitator has the ability to repeat this particular "challenge" if they choose to. For learning purposes, if the user gets anything less than a "perfect score" (or other designated score), then they should repeat the sub-category to better ensure they can produce a fluid answer that contains the key elements, without hesitation and in a confident manner.

Another user interface is provided including a "proceed" control, which when activated, causes the system to verbally state another randomized challenge and the process continues. The training module will inform the user and facilitator when all of the challenges within the sub-category have been completed. The user and facilitator can elect to repeat the sub-category or move on to a different sub-category and/or category. Such repetitive drilling will better ensure trainees will learn the materials.

Figure 3A:
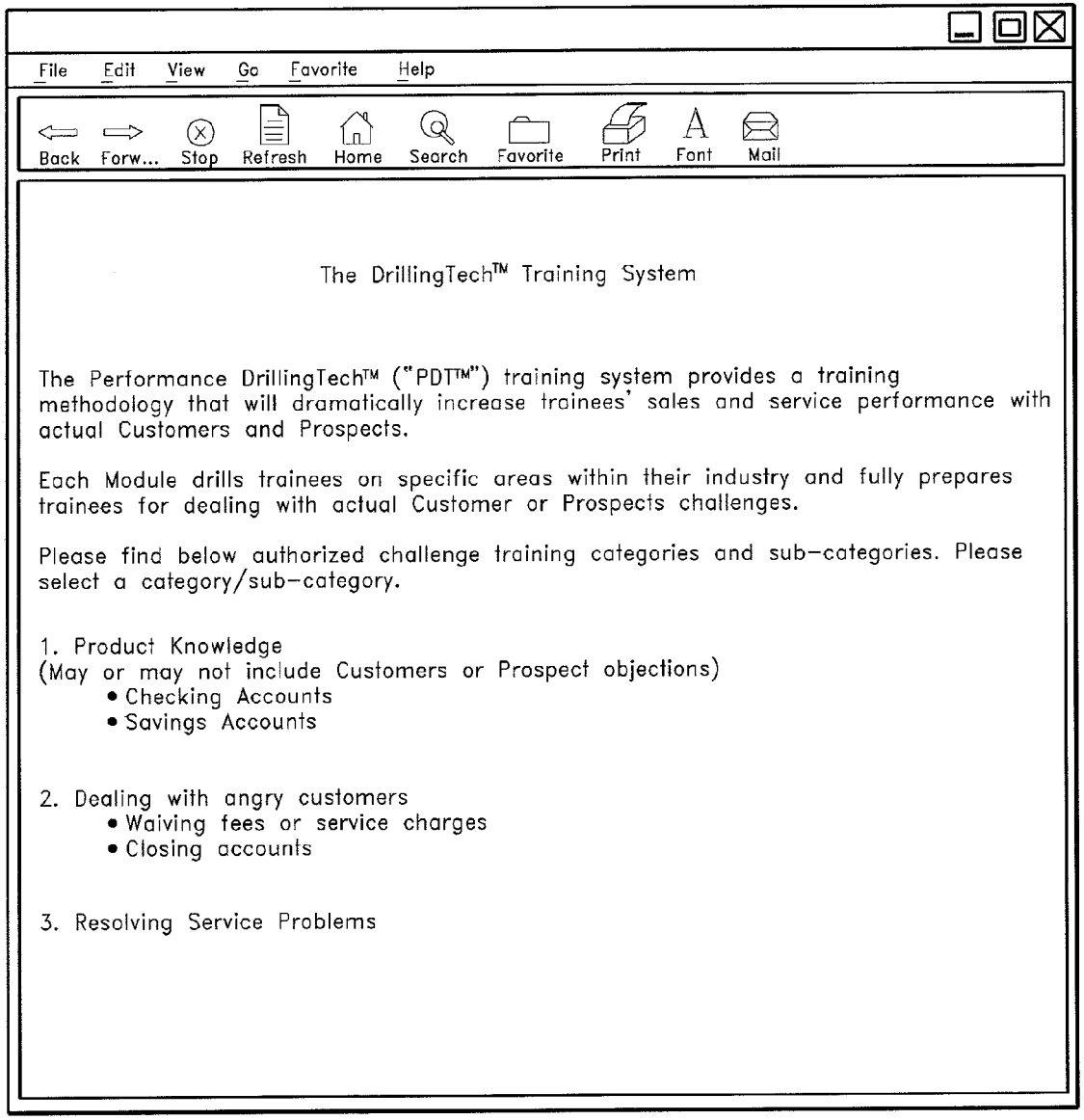
FIGS. 3A-II illustrate example user interfaces.

FIGS. 3A-II illustrate example user interfaces which can be presented via a Web browser or other application. Additional, fewer, or different user interfaces can be used in other example embodiments. The language provided in the example user interfaces are not intended to limit the invention, but are merely examples of language that can be used. Other language and terminology can be used as well. The example interfaces include controls (e.g., in the form of underlined links, buttons, or otherwise) that can be used to navigate the training session (e.g., proceed, next page, click for answer, etc.). Optionally, some or all of the text displayed via the user interface can instead or in addition be verbalized. Optionally, an animated figure/face or prerecorded actual person verbalizes or appears to verbalize some or all of the text or script.

Figure 3B:
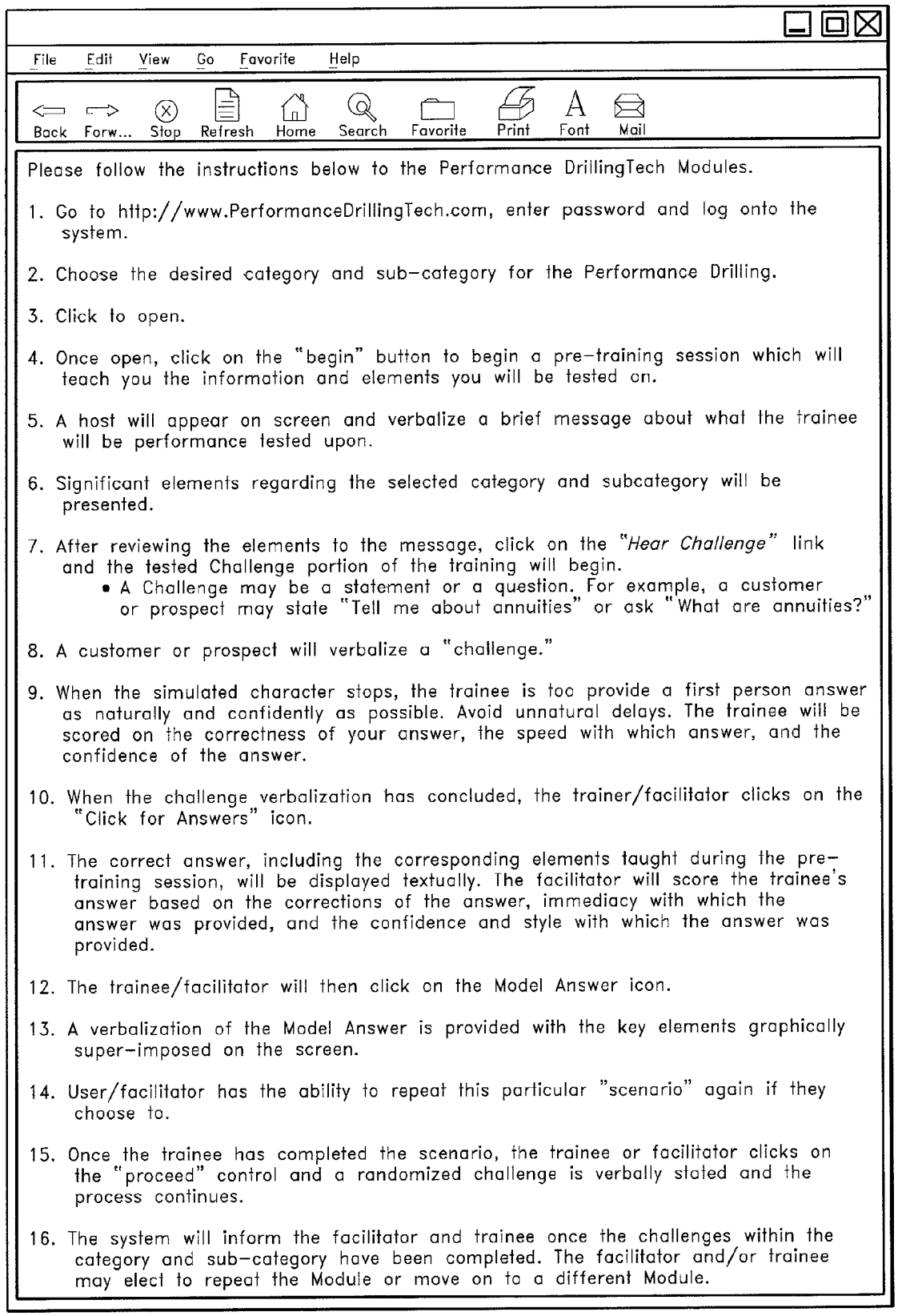

FIG. 3A illustrates an example introduction to the training system, including a listing of example training subject categories and sub-categories. FIG. 3B illustrates example instructions that are optionally presented to a facilitator and/or user which describe how to access a training module. In this example, the instructions provide a Website URL (uniform resource locator) via which the trainer or trainee can log-in and access the training program. The user is further instructed to choose the desired training category/subcategory. The instructions further instruct the trainee/trainer how to initiate the preparatory/pre-training phase of the training module, and provide information as to what to expect during the preparatory/pre-training phase.

The example instructions indicate that after the preparatory/pre-training phase, the "challenge" phase of the training module will be initiated, wherein a video/animated character will verbalize a challenge (e.g., a statement or question). The trainee is instructed how to respond to the challenges and how the trainee's answers will be scored. Instructions are further provided on how to access model answers, and what to expect while accessing model answers. In addition, the trainer/trainee are informed that the scenario can be repeated, that additional challenges will be presented, and that the module can be repeated.

Figure 3C:
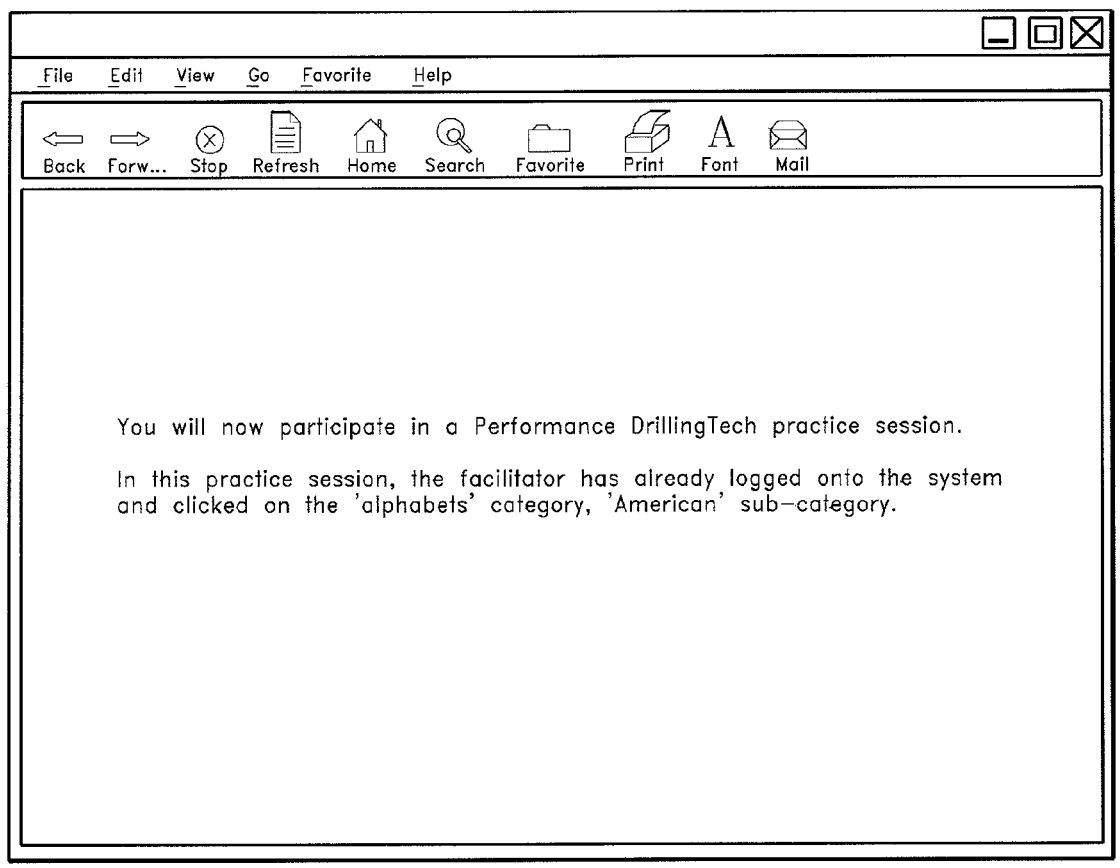
Figure 3D:
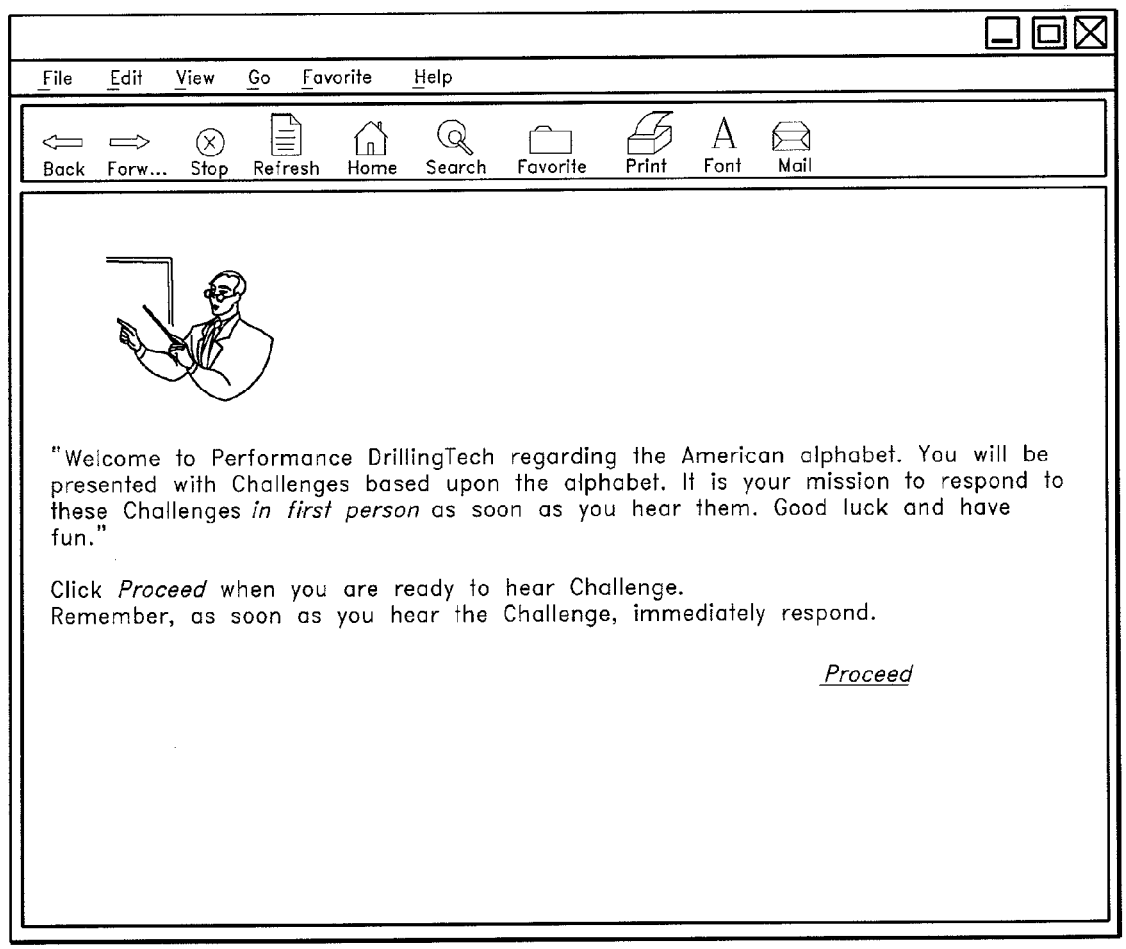

FIG. 3C illustrates an example user interface informing the trainee that a practice training session is about to begin. The trainee is further informed that the facilitator has logged in, is participating in the training session, and has selected a training category/subcategory (e.g., alphabets/American). FIG. 3D illustrates a user interface that provides an explanation to the trainee regarding the upcoming challenge testing, and provides instructions on how the trainee is to respond to the challenges (e.g., in the first person, as soon as the trainee hears a challenge). Optionally, a figure (e.g., an animated figure or actual person) is displayed which appears to verbalize the instructions.

Figure 3E:
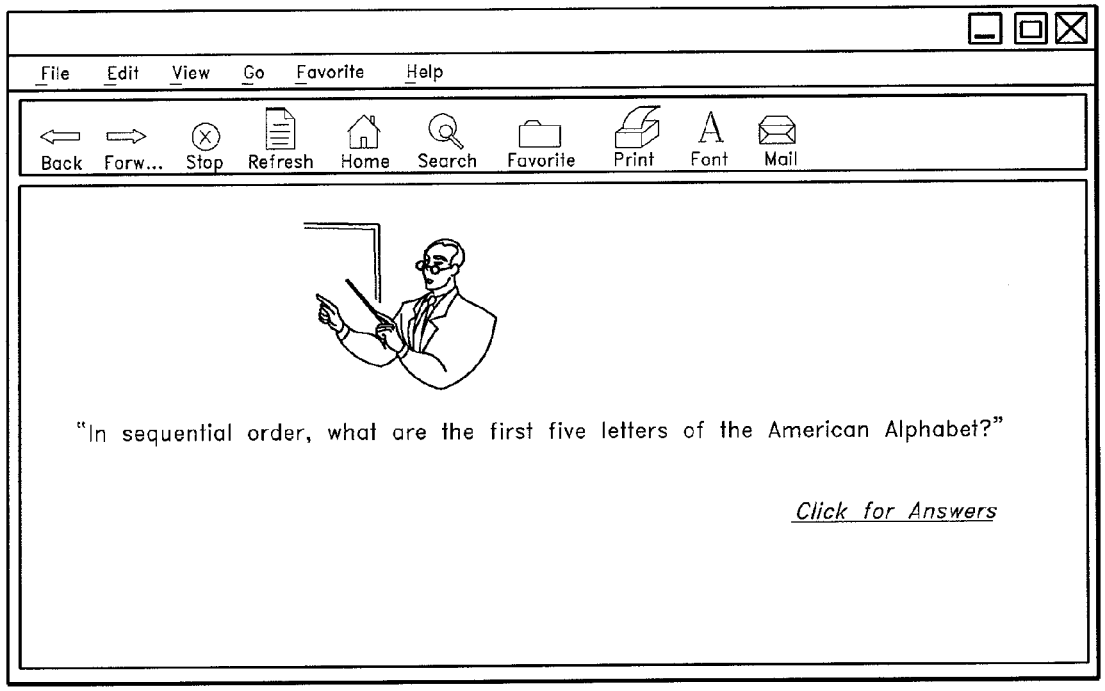
Figure 3F:
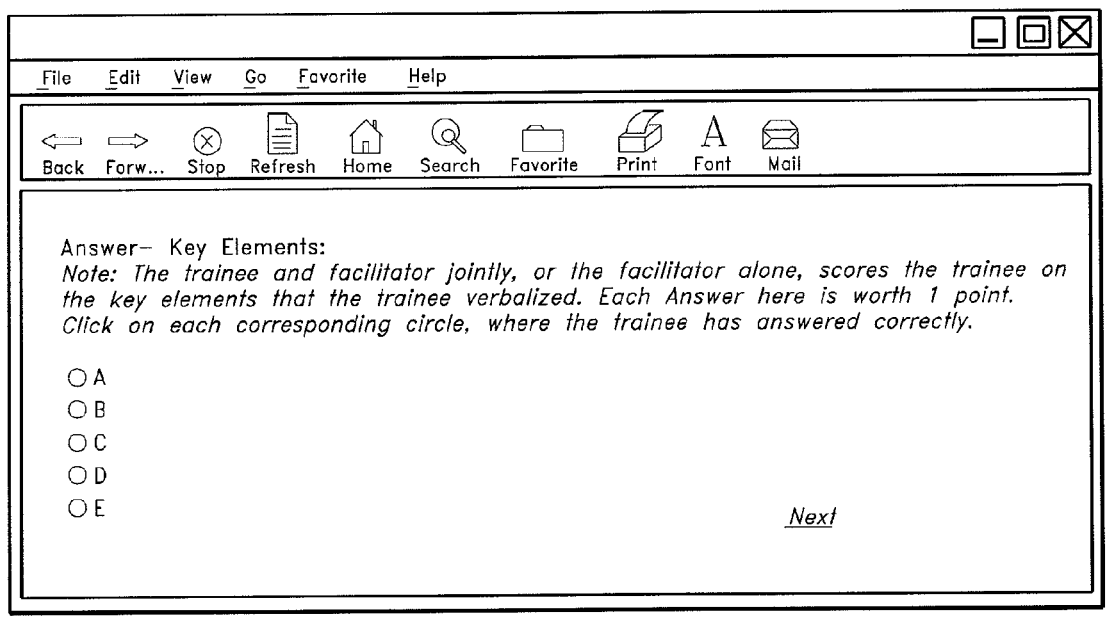
Figure 3G:
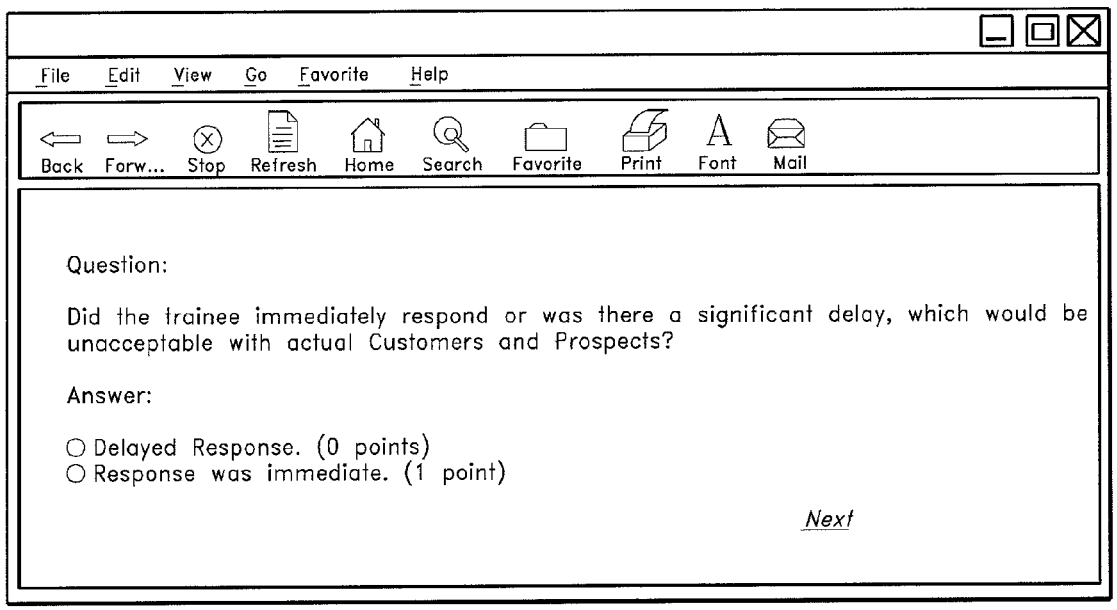
Figure 3H:
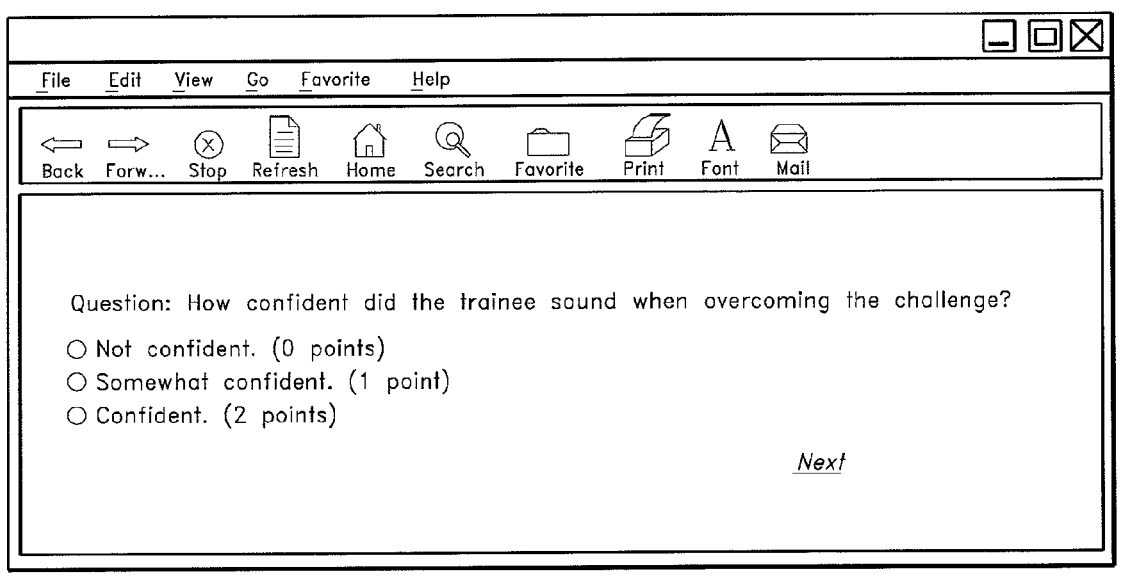

FIG. 3E illustrates an example challenge in the form of a question. FIGS. 3F-3G illustrate example scoring user interfaces, wherein scores (e.g., numerical scores) are assigned for the correctness of a trainee response to a challenge, the timeliness of the response, and the confidence with which the response was delivered. FIG. 3F illustrates an example answer-scoring user interface used to score the correctness of trainee's challenge response. The scoring user interface can be completed by the trainee, the facilitator, or both jointly, as permitted by the training rules. FIG. 3G illustrates a scoring user interface used to score the timeliness of the trainee's challenge response (e.g., whether the response was undesirably delayed or immediate). FIG. 3H illustrates a scoring interface used to score the confidence with which the trainee responds to the challenge (e.g., not confident, somewhat confident, confident), with a different number of points assigned based on the level of confidence.

Figure 3I:
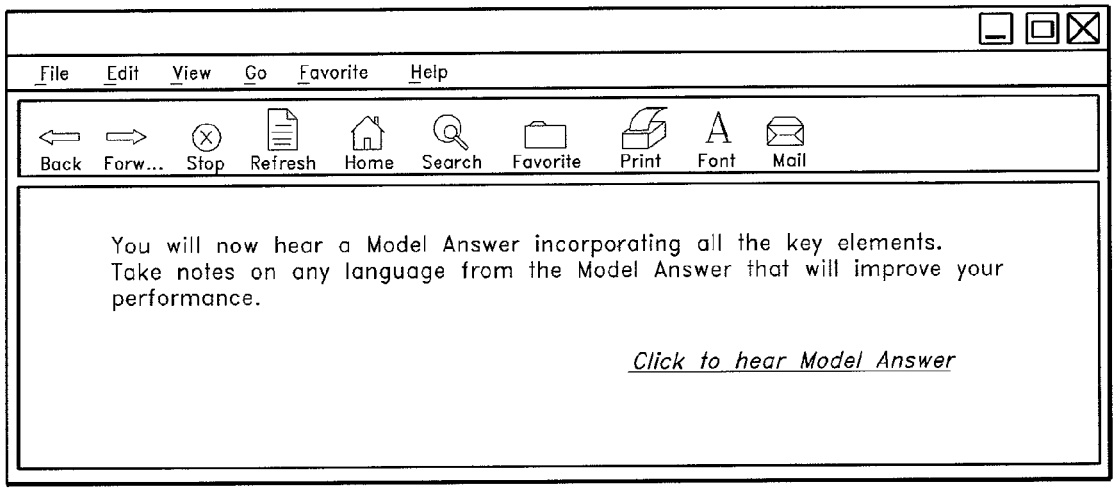
Figure 3J:
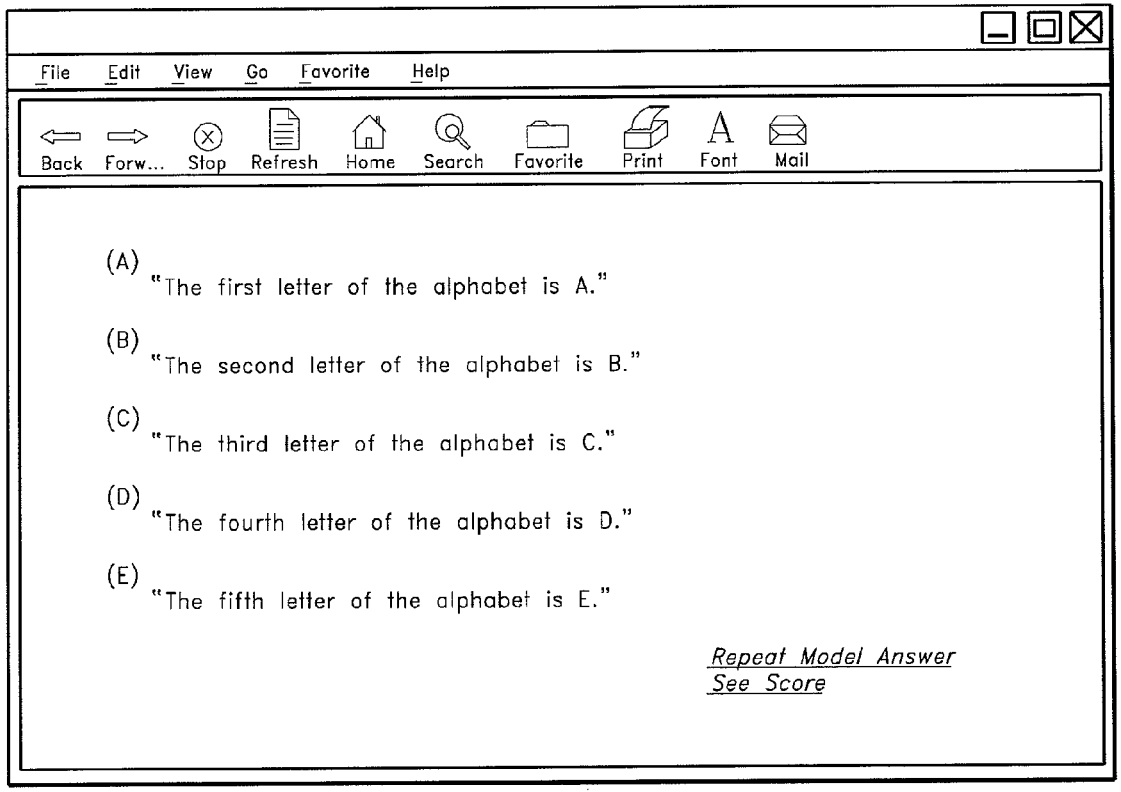
Figure 3K:
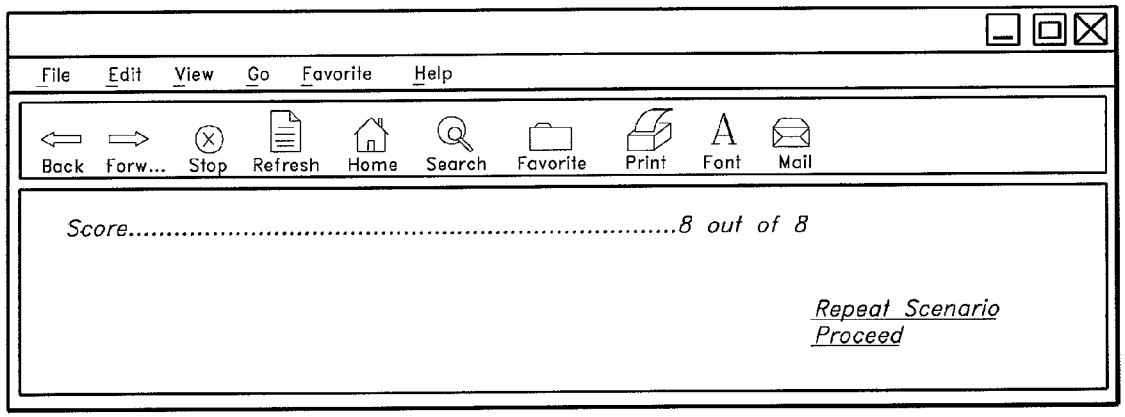

FIG. 3I illustrates a user interface that explains that a model answer will be presented listing the elements that should have been provided in response to the challenge. The trainee is further informed that notes may be taken (e.g., to enhance the trainee's performance). FIG. 3J illustrates the correct elements, wherein the elements are optionally sequentially and cumulatively displayed and verbalized, so that when the last element is displayed all the elements are displayed. FIG. 3K illustrates the calculated total score for the trainee's challenge response. A "repeat scenario" control is provided in this example, which when activated by the trainee/trainer causes the challenge to be repeated. A "proceed" control is provided that, when activated, causes the system to present the next challenge. Optionally, the next challenge is randomly/pseudo-randomly selected by the training system. Optionally, the trainer or trainee selects the next challenge.

Figure 3L:
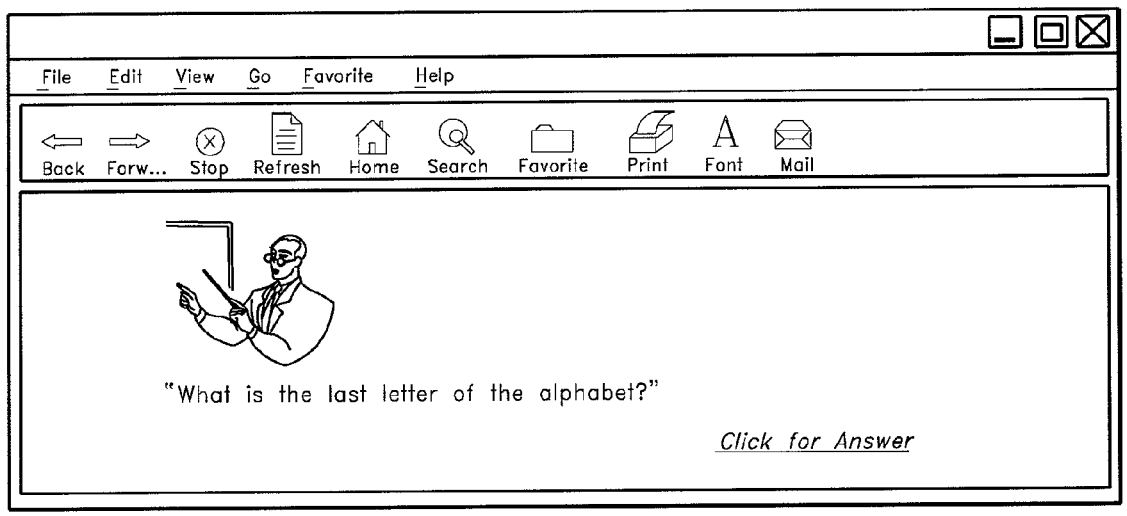
Figure 3M:
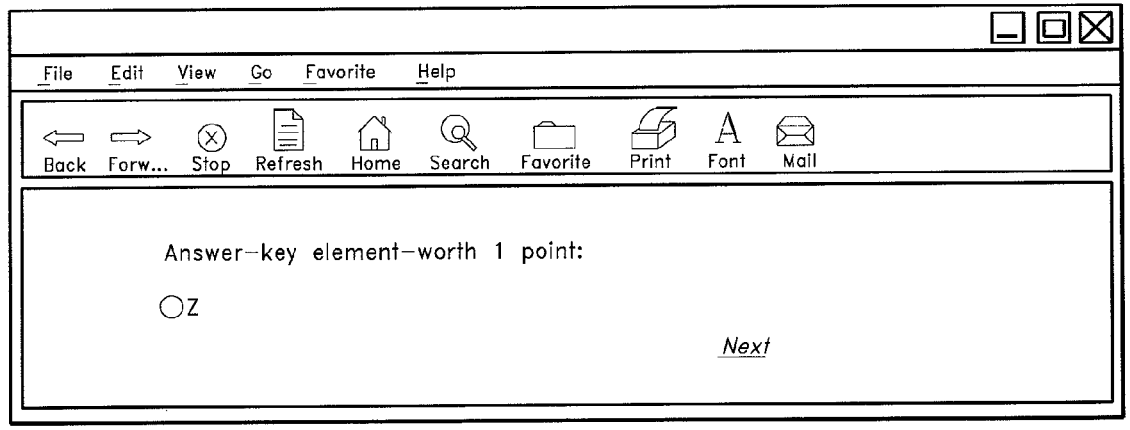
Figure 3N:
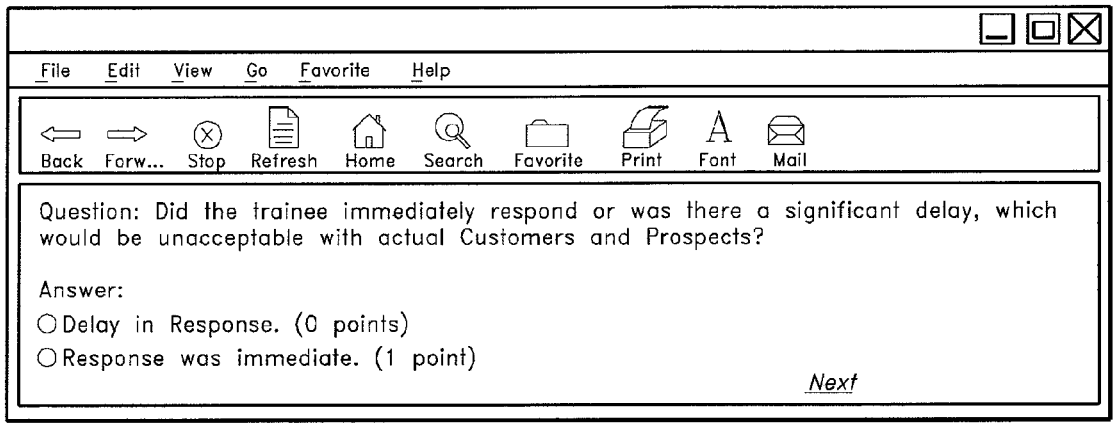
Figure 3O:
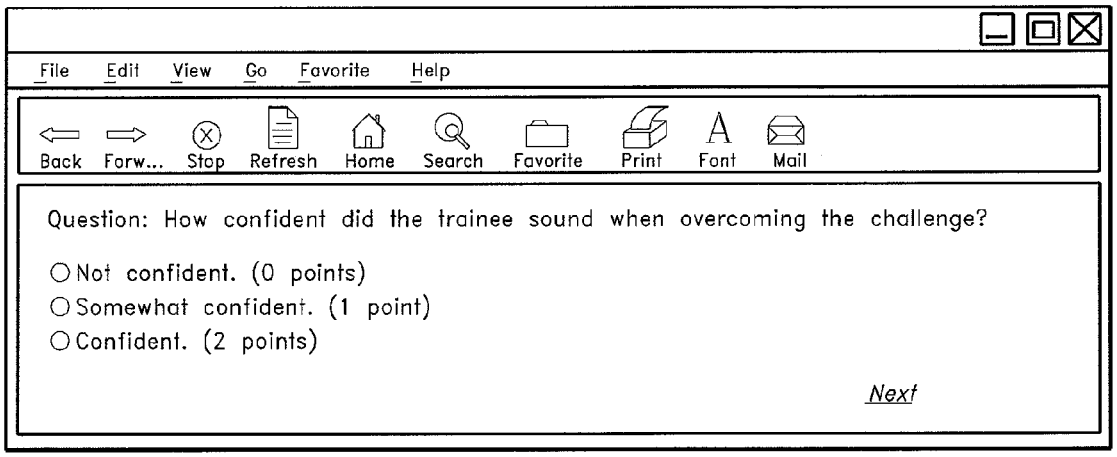
Figure 3P:
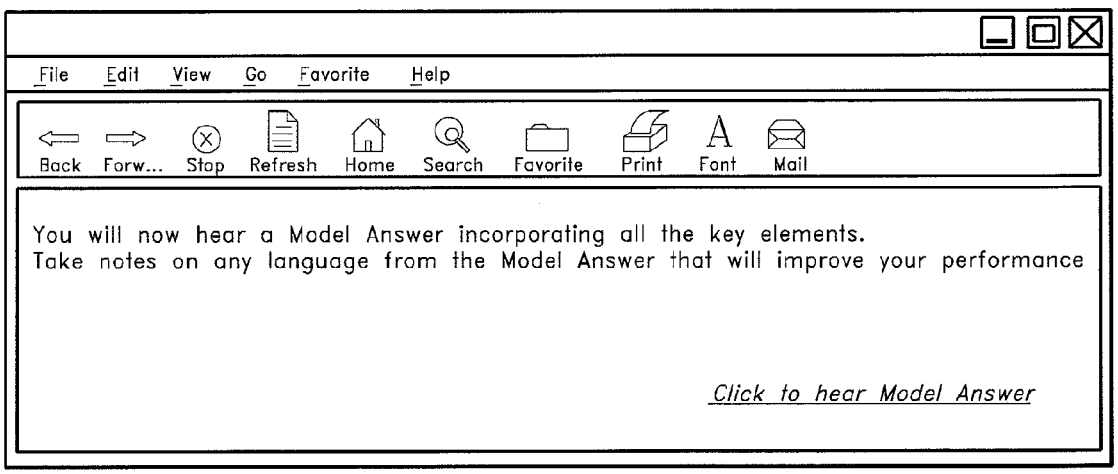
Figure 3Q:
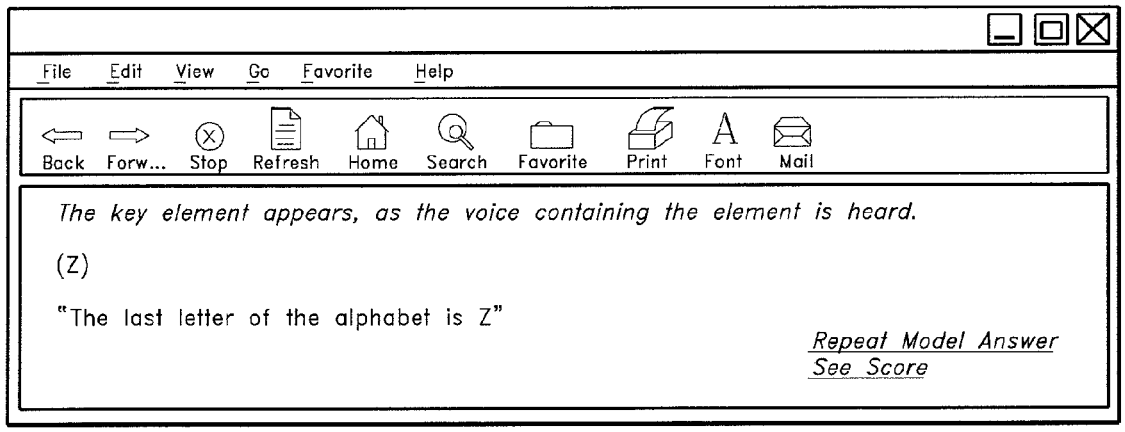
Figure 3R:
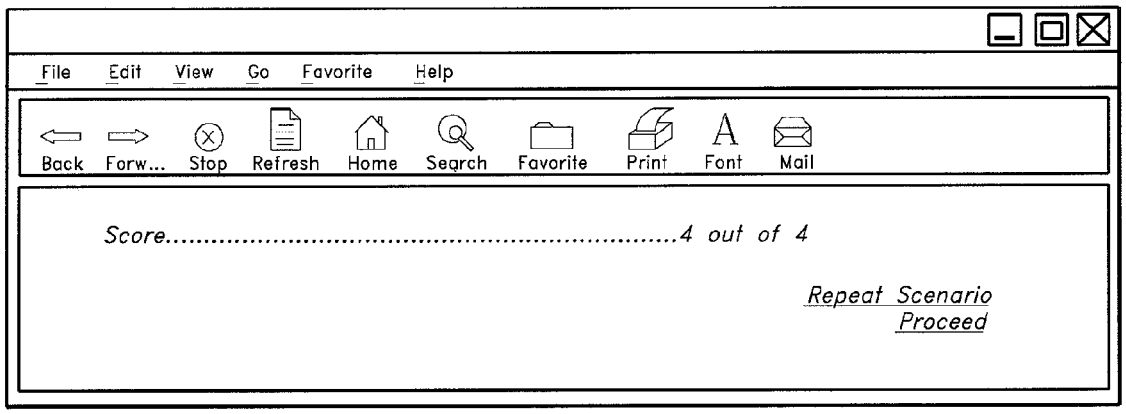

FIG. 3L illustrates the presentation of the next challenge. FIGS. 3M-3O illustrate example scoring user interfaces for the second challenge, wherein scores (e.g., numerical scores) are assigned for the correctness of a trainee response to a challenge, the timeliness of the response, and the confidence with which the response was delivered. FIG. 3P illustrates a user interface that explains that a model answer will be presented listing the elements that should have been provided in response to the challenge. The trainee is further informed that notes may be taken (e.g., to enhance the trainee's performance). FIG. 3Q illustrates the key elements, wherein the element is optionally verbalized. FIG. 3R illustrates the calculated total score for the trainee's challenge response.

Figure 3S:
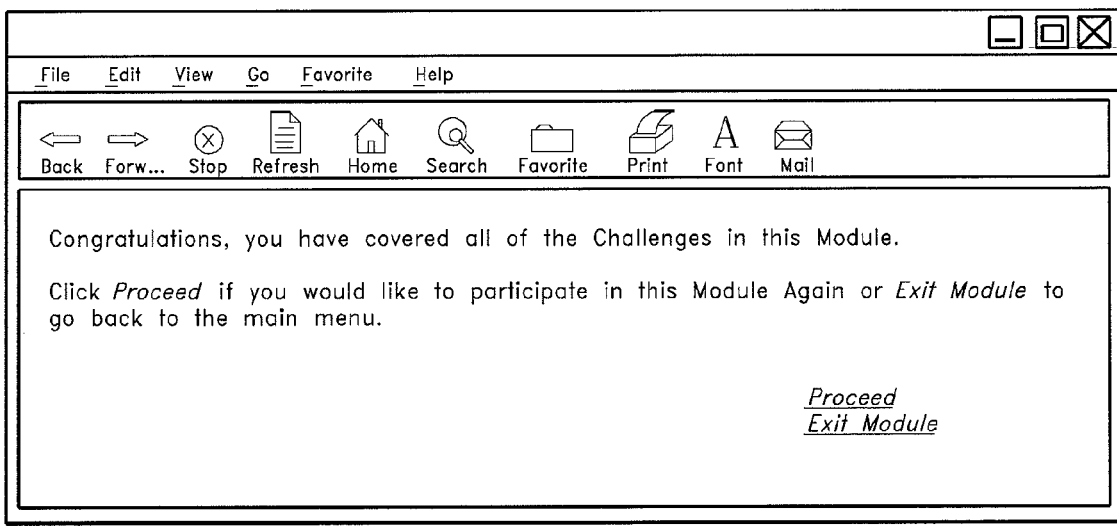

FIG. 3S illustrates an example user interface congratulating the trainee on completing the challenges in the present module. The trainee is further instructed to activate a "proceed" control to further utilize the current training module, or to activate and "exit module" control in order to proceed to the main menu (e.g., where the trainer/trainee can select another training module).

Figure 3T:
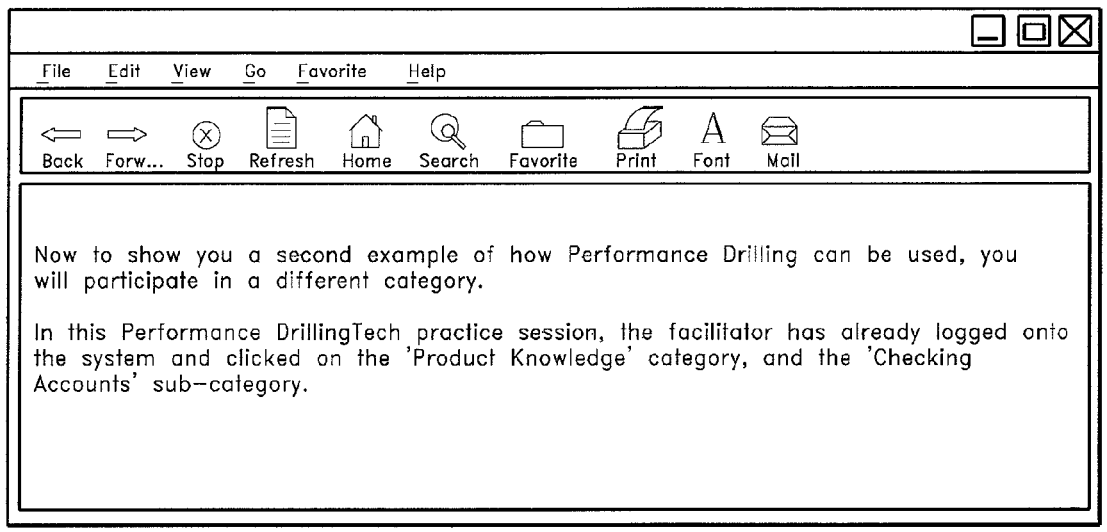
Figure 3U:
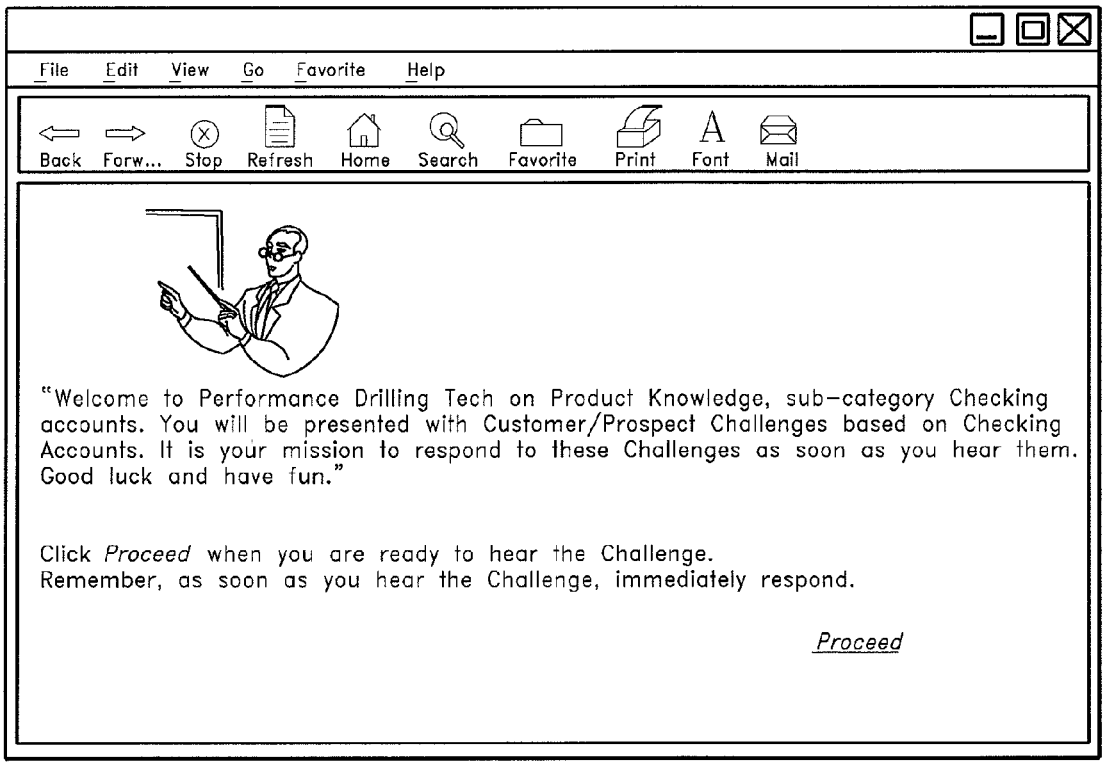
Figure 3V:
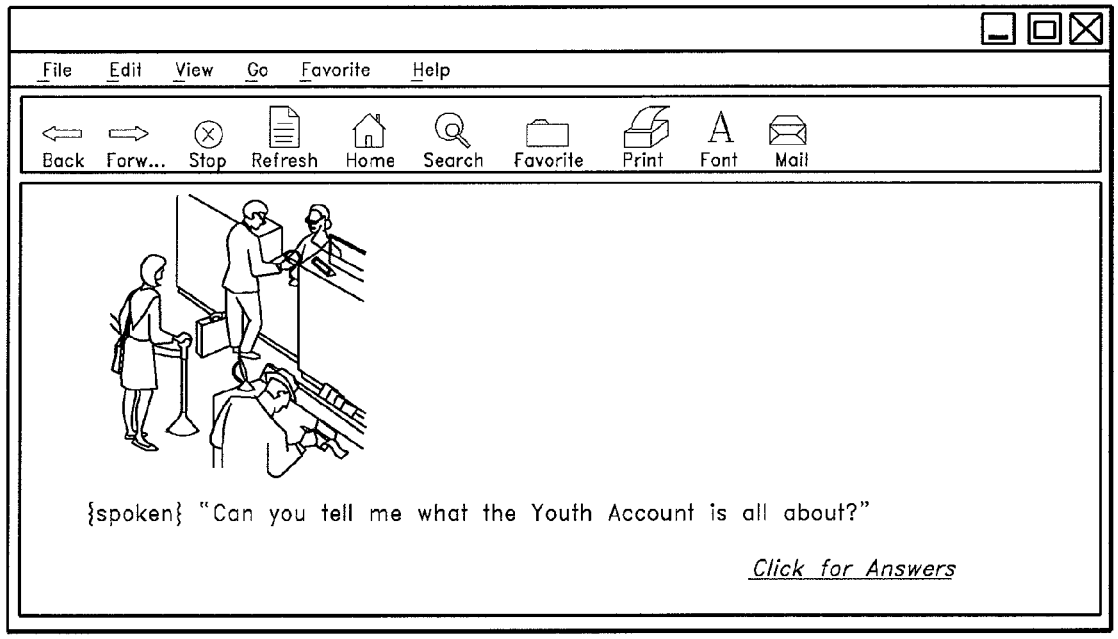
Figure 3W:
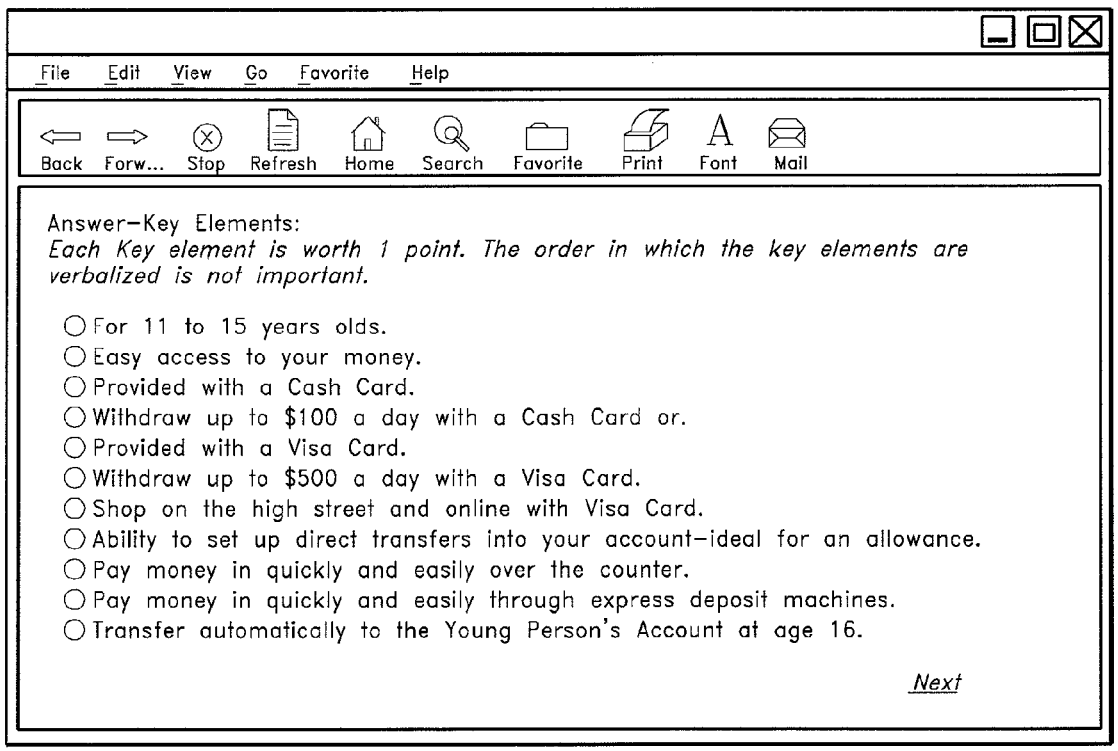
Figure 3A:
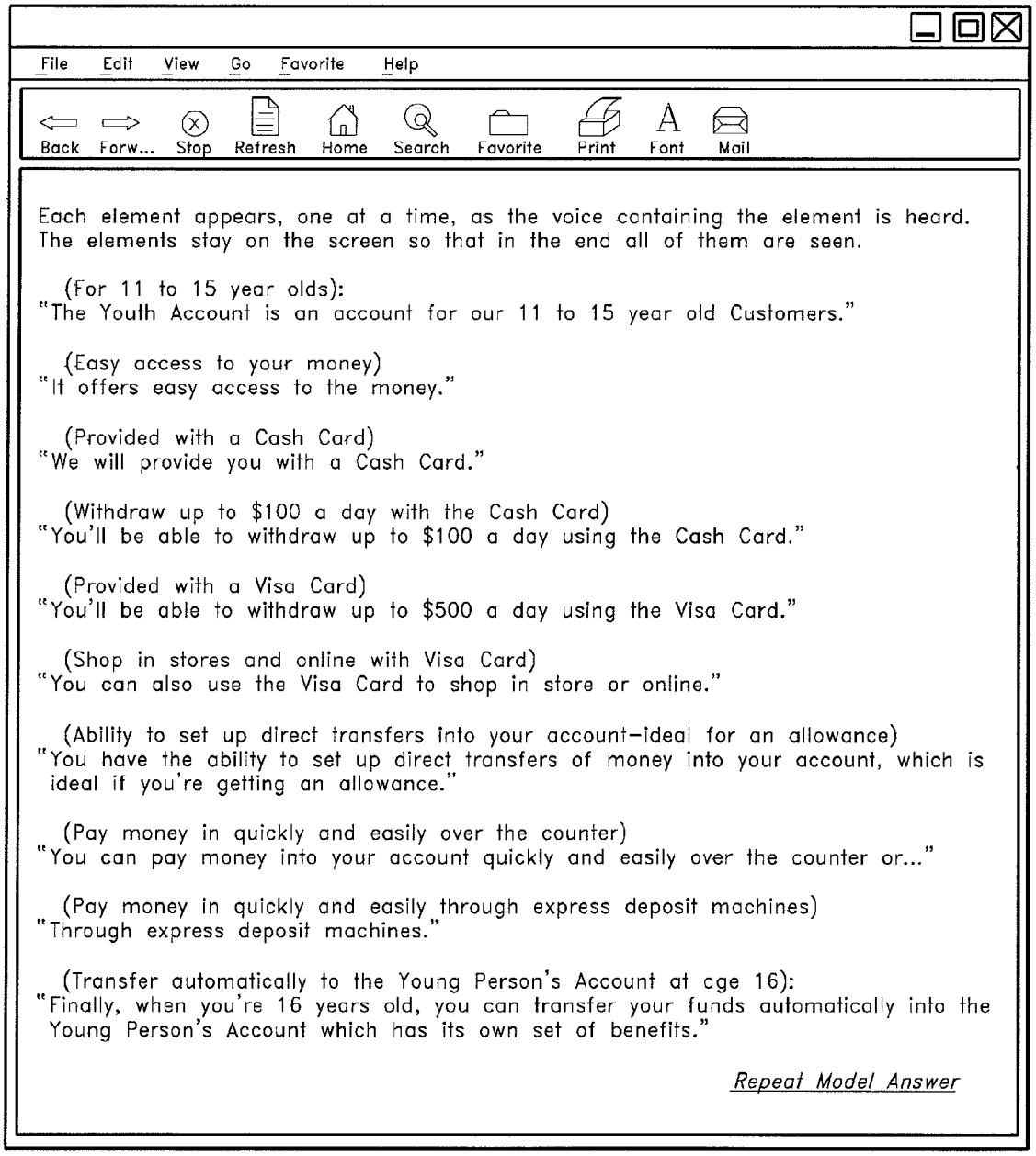
Figure 3B:
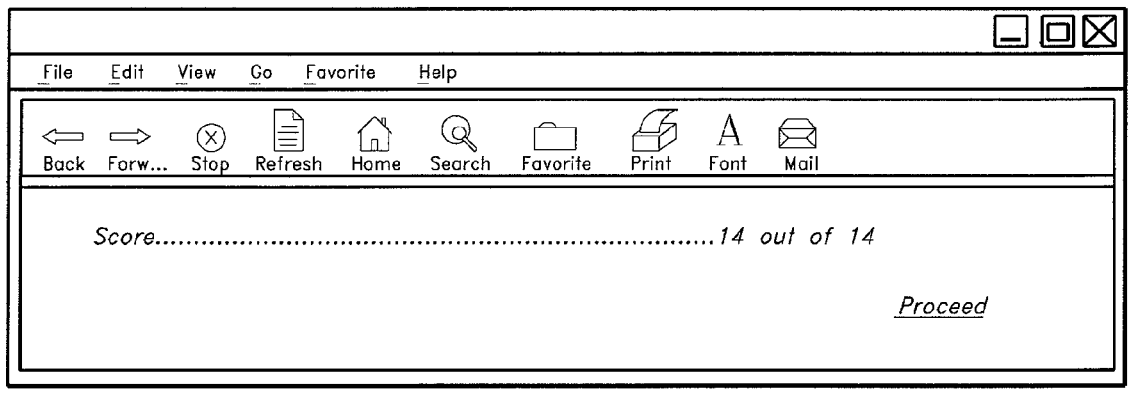
Figure 3C:
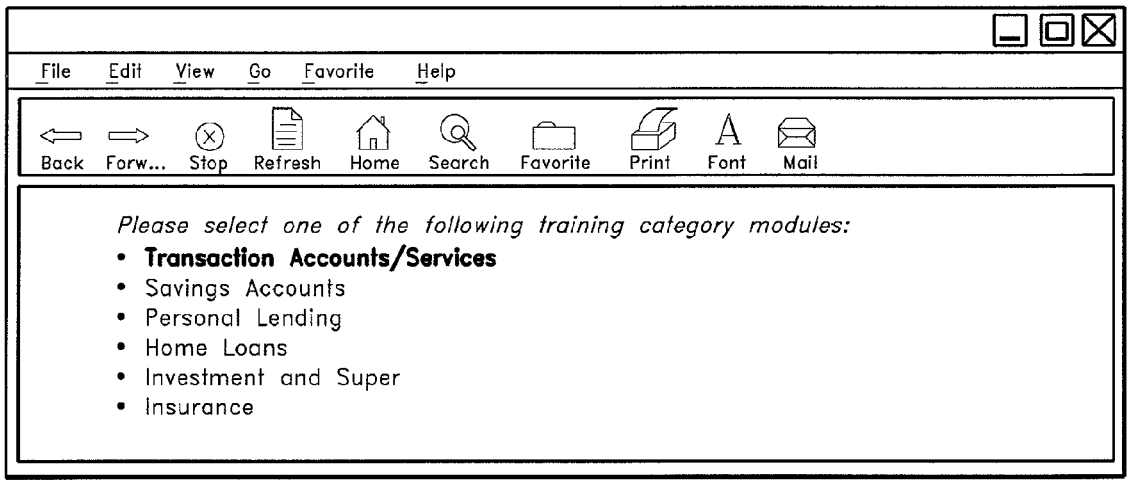
Figure 3D:
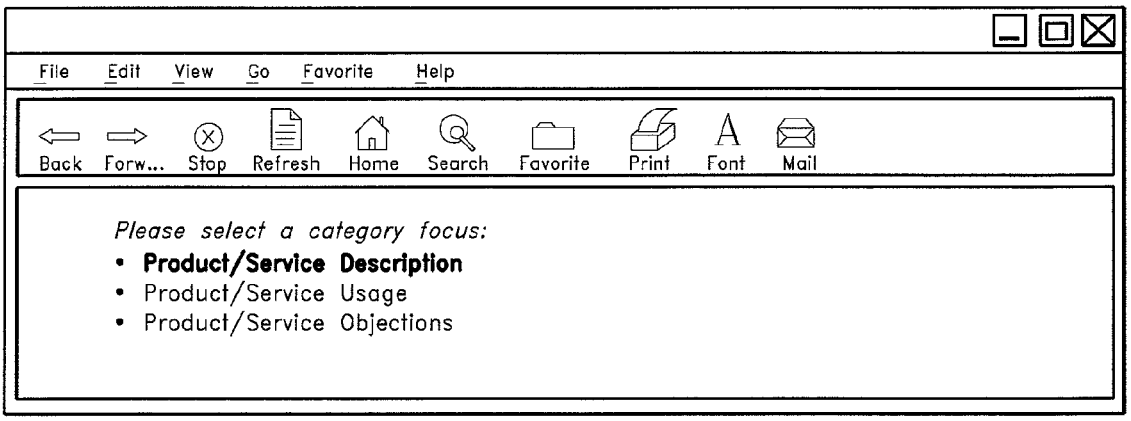
Figure 3E:
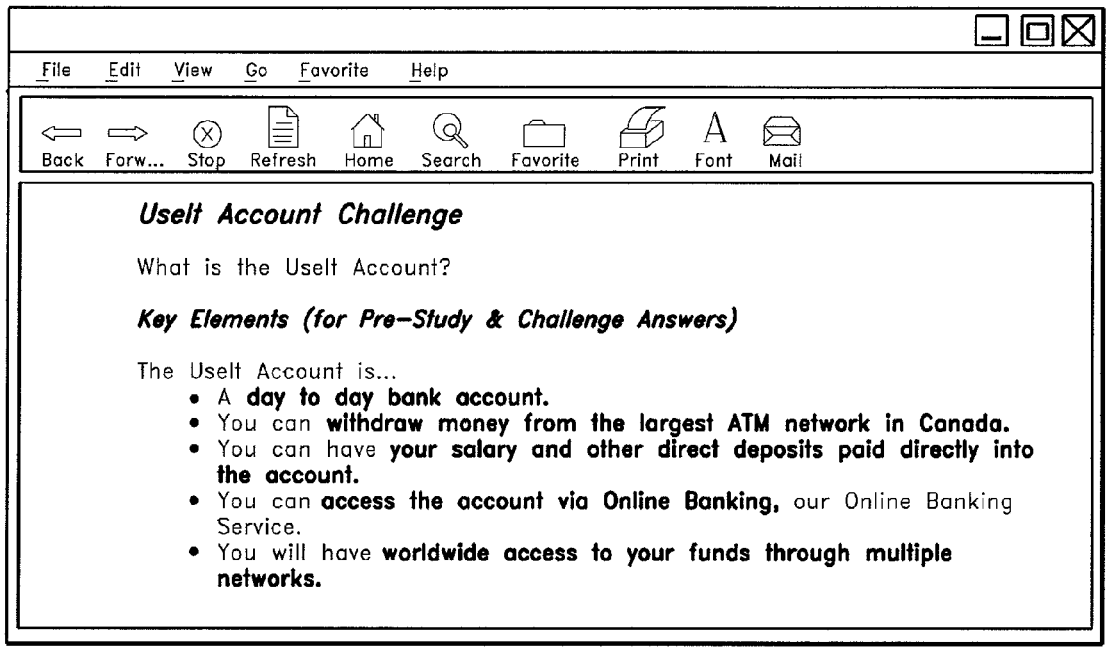
Figure 3F:
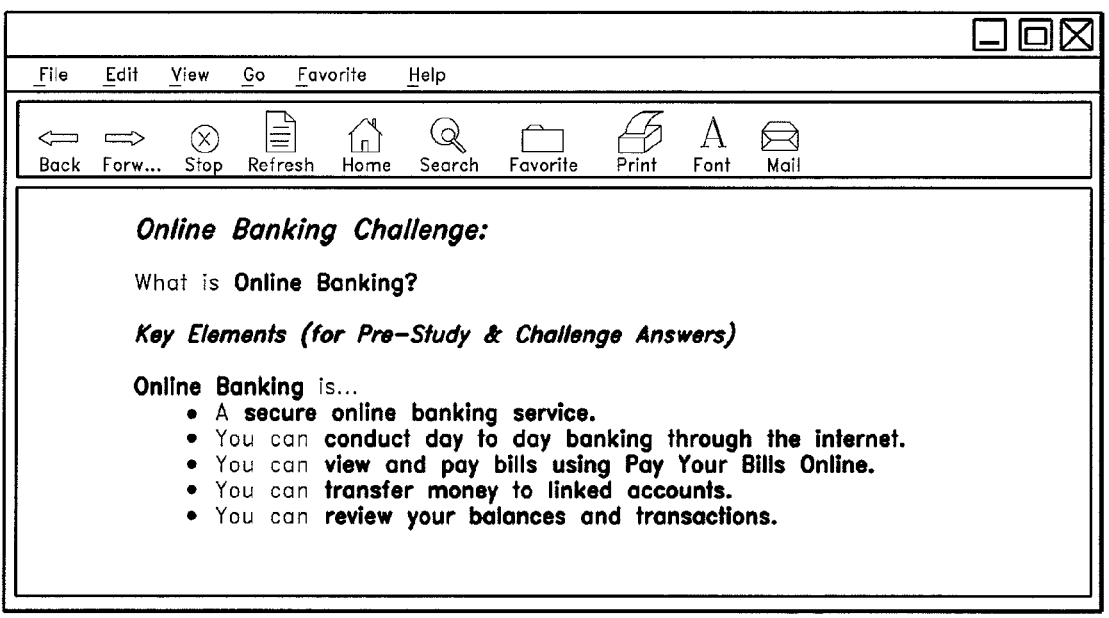
Figure 3G:
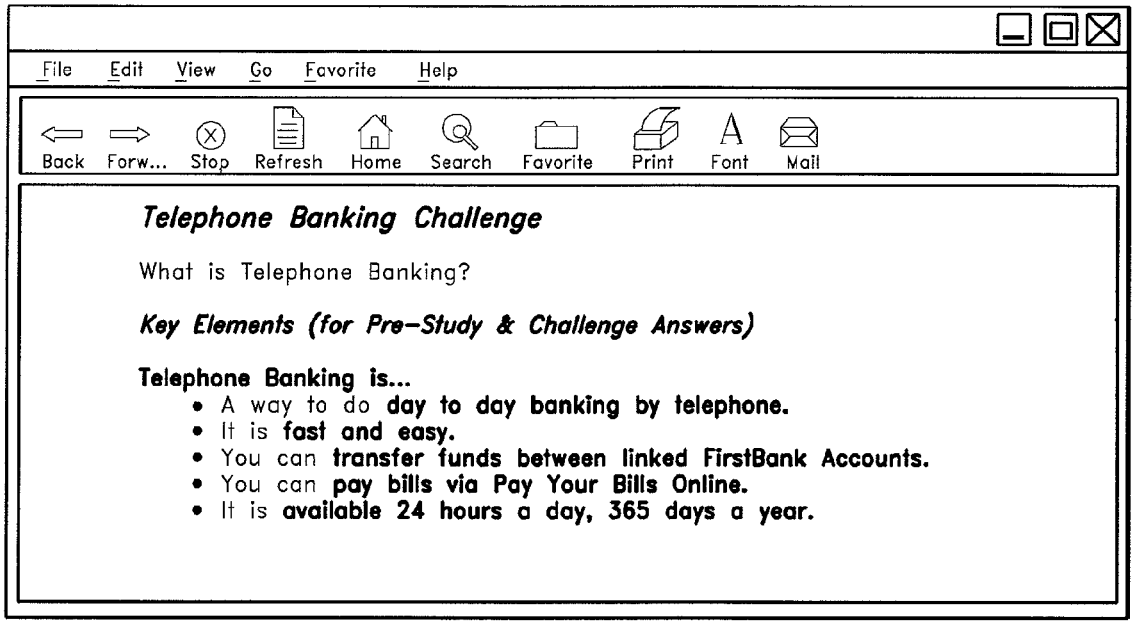
Figure 3H:
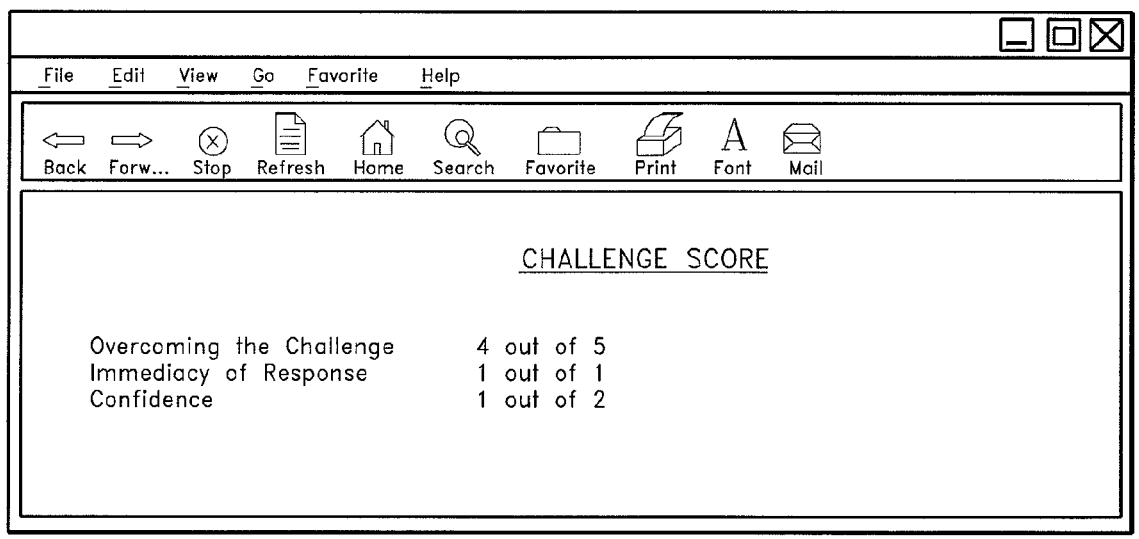
Figure 3I:
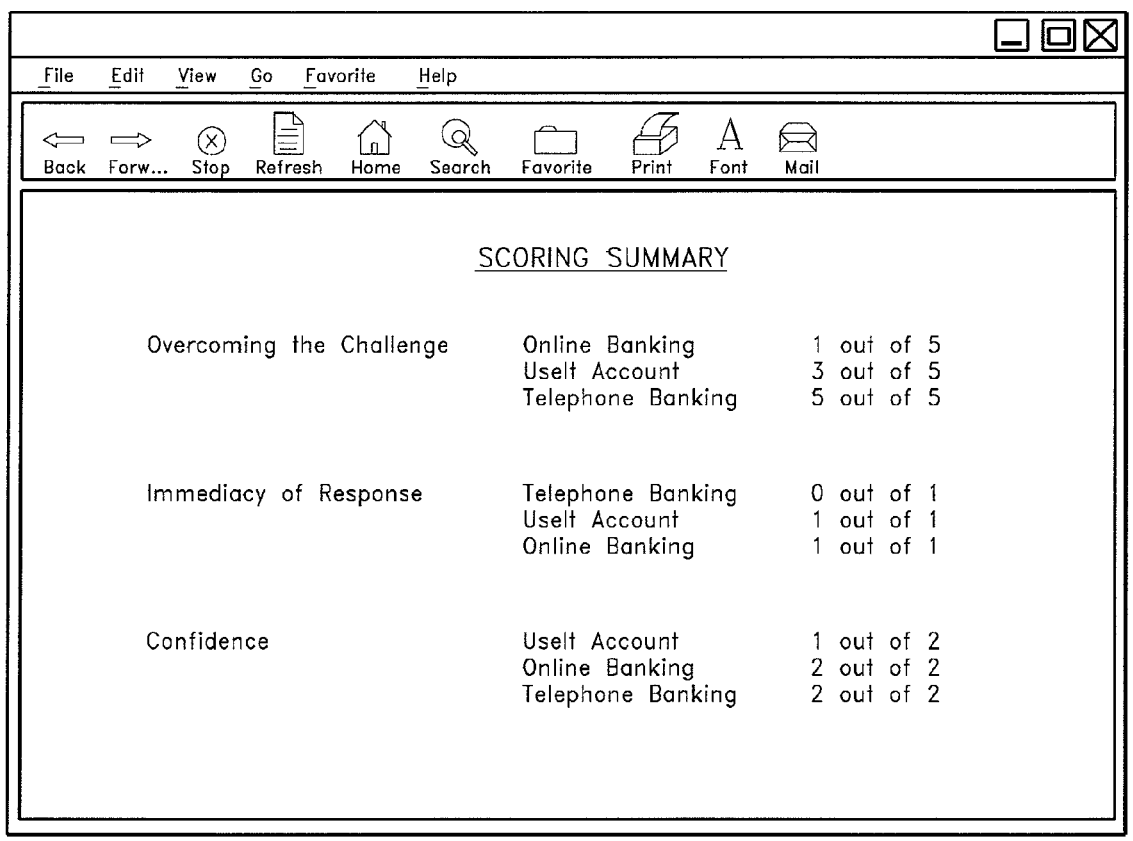

FIG. 3T illustrates a user interface that explains to the trainee that the trainee will not participate in a training module in a different category (product knowledge/checking accounts). FIG. 3U illustrates a user interface that provides an explanation to the trainee regarding the upcoming challenge testing and provides instructions on how the trainee is to respond to the challenges. Optionally, a figure is displayed which appears to verbalize the instructions. FIG. 3V illustrates a user interface where another challenge is presented, this one related to a checking account for minors. FIGS. 3W-3Y illustrate example scoring user interfaces for the second challenge, wherein scores (e.g., numerical scores) are assigned for the correctness of a trainee response to a challenge, the timeliness of the response, and the confidence with which the response was delivered.

FIG. 3Z illustrates a user interface that explains that a model answer will be presented listing the elements that should have been provided in response to the challenge. The trainee is further informed that notes may be taken (e.g., to enhance the trainee's performance). FIG. 3AA illustrates the correct elements, wherein the elements are optionally sequentially and cumulatively displayed and verbalized, so that when the last element is displayed, all the elements that the trainee should have provided are displayed. FIG. 3BB illustrates the calculated total score for the trainee's challenge response. A "repeat challenge(s)" control is provided in this example, which when activated by the trainee/trainer causes the challenge to be repeated, but, optionally, only after the final scores are calculated. A "see score" control is provided that, when activated, causes the current score for the challenge to be presented.

FIG. 3CC illustrates another example category selection user interface via which the trainee or the facilitator can select a training category (e.g., a different product or service to be trained on). Once the training category is selected, the example user interface illustrated in FIG. 3DD is presented via which a category focus can be selected (e.g., Product/Service Description, Product/Service, Product/Service Objections).

FIGS. 3EE-3GG illustrates another set of example user interfaces providing key elements during the pre-training stage. The corresponding model answers are optionally the same as the key elements. The key elements and model answers can be presented textually and/or audibly. Certain portions of the key elements and model answers are emphasized to highlight the important concepts.

FIG. 3HH illustrates another example user interface providing scoring for a challenge response. FIG. 3II illustrates another example user interface providing a scoring summary for a training session. The summary includes scoring for drilling in three different product categories. In this example, scores are displayed in rank order with the weakest/lowest score on top and strongest/highest score at the bottom within each component of the score.

Optionally, a pre-recorded or synthesized voice (e.g., a "signature voice") tells the users how they did (e.g., a voice that simulates a robot speaking in a stilted manner, pirate, or other not real or fictional character). This includes an indication as to how the user did vs. others and/or vs. "the machine". That is, certain scores would trigger a verbalization such as "you have defeated me!" while others might trigger "I have defeated you . . . try again". Optionally, the indications can instead or in addition to provided via text or with a "traditional" voice as well.

Optionally, there can be pre-scoring when the user participates alone, which can then be compared to scoring when the user works with a facilitator.

Optionally, training can be done in a self-study mode without a trainer/facilitator. Thus, the system can be used for self-coaching.

Optionally, a replay option is provided for each category and/or sub-category (or a subset thereof) for performance improvement.

Optionally, instructions will be verbalized.

Thus, as discussed above, certain embodiments teach and train a user to utilize information and skills in a simulated real-world environment. The user optionally undergoes extensive testing, where their performance is scored based on their retention of the information, and their ability to provide the information to others in a natural, confident manner. Thus, the training system aids users in internalizing and behaviorally embedding information and skills learned during training. Users are optionally trained to provide information, respond to objections, or ask questions as appropriate almost automatically, without undesirable pauses.

It should be understood that certain variations and modifications of this invention would suggest themselves to one of ordinary skill in the art. The scope of the present invention is not to be limited by the illustrations or the foregoing descriptions thereof.

What is claimed is:

1. A computerized training system comprising non-transitory computer readable memory storing programmatic code, that when executed by a computing device is configured to perform operations comprising:

receive a selection of at least one training subject;

present via a first study session user interface on a trainee terminal during a study session a challenge, wherein the challenge is to be audibly responded to when delivered by a simulated customer or prospect during a first practice session, the challenge corresponding to the selected training subject, and role model phrases including key elements that a trainee is to be tested on, wherein the challenge and role model phrases are presented as written text and the key elements are visually emphasized as compared to the phrases in which they are incorporated, and wherein the role model phrases provide a model of a response to the challenge and wherein the role model phrases are visually separated from each other when presented;

textually present via a second study session user interface on the trainee terminal the challenge and the key elements, wherein the key elements are not embedded in surrounding phrases and are visually separated from one another and wherein the challenge is to be audibly responded to when delivered by the simulated customer or prospect during the first practice session, present a video or animation of a character that audibly recites:
the key elements without the surrounding phrases, or
the role model phrases including the key elements, or
both the key elements without the surrounding phrases and the role model phrases including the key elements;

via a first practice session user interface, provide the trainee with the challenge from the simulated customer or prospect, wherein the challenge is provided textually and via a video or animation of the real or simulated customer or prospect, and wherein the trainee is to provide a verbal, audible response to the challenge;

after receipt of an indication that the trainee has audibly responded to the challenge presented via the first practice session user interface, present the challenge, provided from the simulated customer or prospect via the first practice session user interface, and the corresponding key elements in at least textual form to the trainee; and provide navigation controls via which the trainee can navigate directly between user interfaces, including from the first practice session user interface back to a previously presented study session user interface.

2. The system as defined in claim 1, wherein the programmatic code is further configured to:

store a first challenge score related to:
correctness of the audibly provided trainee challenge response, or
completeness of the audibly provided trainee challenge response, or
both the correctness of the audibly provided trainee challenge response and the completeness of the audibly provided trainee challenge response;
wherein the first score is based at least in part on a correspondence of the trainee challenge response to corresponding key elements presented during the study session.

3. The system as defined in claim 2, wherein the programmatic code is further configured to:

receive and store a second challenge score related to the audibly verbalized trainee response, wherein the second challenge score is related to how quickly the trainee initiated the challenge response; and receive and store a third challenge score related to the audibly verbalized trainee response, wherein the third challenge score is related to:
confidence with which the trainee verbalized the challenge response, or
style with which the trainee verbalized the challenge response, or
both the confidence with which the trainee verbalized the challenge response and the style with which the trainee verbalized the challenge response.

4. The system as defined in claim 3, wherein the programmatic code is further configured to use a formula to generate a cumulative score using at least the following:

the first challenge score related to:
correctness of the challenge response, or
completeness of the challenge response; or
both the correctness of the challenge response and the completeness of the challenge response;
the second challenge score related to how quickly the trainee provided the challenge response; and
the third challenge score related to:
the confidence with which the trainee verbalized the challenge response, or the style with which the trainee verbalized the challenge response, or both the confidence with which the trainee verbalized the challenge response and the style with which the trainee verbalized the challenge response.

5. The system as defined in claim 1, wherein the programmatic code is further configured to present each key element in bullet form via the second study session user interface.

6. The system as defined in claim 1, wherein the programmatic code is further configured to provide for display on the trainee terminal each role model phrase in bullet form.

7. The system as defined in claim 1, wherein the programmatic code is further configured to present a control, which when activated by the trainee, causes a user interface to be repeated.

8. The system as defined in claim 1, wherein the training subject is related to:
(a) sales, or
(b) service, or
(c) how to relate in a personal situation, or
(d) academic knowledge,
(e) overcoming objections to a course of action, or
(f) proper procedures at a place of employment, or
any combination of (a), (b), (c), (d), (e), or (f).

9. The system as defined in claim 1, further comprising the trainee terminal, a facilitator terminal used to enter scores, and a server configured to service the first study session user interface, the second study session user interface, and the first practice session user interface.

10. The system as defined in claim 1, wherein a complete response to the challenge includes a plurality of elements describing a product or service.

11. A method of providing training using a computerized system, the method comprising:
receiving, at the computerized system, a selection of at least one training subject;
at least partly in response to receiving the selection, providing, via the computerized system, for display on a trainee terminal during a study session a first study session user interface, the first study user interface including a challenge, wherein the challenge is to be audibly responded to by a trainee when delivered by a simulated customer or prospect during a first practice session, the challenge corresponding to the selected training subject and role model phrases including key elements that the trainee is to be tested on, wherein
the challenge and role model phrases are provided for display as written text,
the key elements are visually emphasized as compared to the phrases in which they are incorporated, and
the role model phrases provide a model of a response to the challenge and wherein the role model phrases are visually separated from each other when presented and wherein the challenge is to be audibly responded to when delivered by the simulated customer or prospect during the first practice session;
providing, via the computerized system, for display on the trainee terminal a second study session user interface, the second study session user interface including the challenge and the key elements in text form, wherein the key elements are not embedded in surrounding phrases and are visually separated from one another and wherein the challenge is to be audibly responded to when delivered by the simulated customer or prospect during the first practice session, providing, via the computerized system, for display on the trainee terminal a video or animation of a character audibly reciting the key elements without:
the surrounding phrases, or
the role model phrases including the key elements, or
both the surrounding phrases and the role model phrases including the key elements;
providing, via the computerized system, for display on the trainee terminal a first practice session user interface that presents the trainee with the challenge from the simulated customer or prospect, wherein the challenge is provided textually and via a video or animation of the real or simulated customer or prospect, and wherein the trainee is to provide a verbal, audible response to the challenge;
after receipt, at the computerized system, of an indication that the trainee has audibly responded to the challenge presented via the first practice session user interface, providing, via the computerized system, for display on the trainee terminal the challenge, provided from the simulated customer or prospect via the first practice session user interface, and the corresponding key elements in at least textual form to the trainee;
calculating at least one score related to the audibly provided trainee challenge response;
providing the calculated at least one score for display;
providing, via the computerized system, navigation controls via which the trainee can navigate directly between user interfaces, including from the first practice session user interface back to a previously presented study session user interface;
receiving, at the computerized system, navigation instructions via the navigation controls; and
responding, via the computerized system, to the navigation instructions by providing a corresponding user interface.

12. The method as defined in claim 11, further comprising storing a first challenge score related to:
correctness of the audibly provided trainee challenge response, or
completeness of the audibly provided trainee challenge response, or
both the correctness of the audibly provided trainee challenge response and the completeness of the audibly provided trainee challenge response,
wherein the first challenge score is based at least in part on a correspondence of the trainee challenge response to corresponding key elements presented during the study session.

13. The method as defined in claim 12, further comprising:
receiving and storing a second challenge score related to the audibly verbalized trainee response, wherein the second challenge score is related to how quickly the trainee initiated the challenge response; and
receiving and storing a third challenge score related to the audibly verbalized trainee response, wherein the third challenge score is related to:
confidence, or
style,
or both the confidence and style,
with which the trainee verbalized the challenge response.

14. The method as defined in claim 13, further comprising:
generating a cumulative score using at least the following:
the first challenge score related to:
correctness of the challenge response, or
completeness of the challenge response; or both the correctness of the challenge response and the completeness of the challenge response;

the second challenge score related to how quickly the trainee provided the challenge response; and the third challenge score related to:

the confidence and/or style with which the trainee verbalized the challenge response the confidence with which the trainee verbalized the challenge response, or the style with which the trainee verbalized the challenge response, or both the confidence with which the trainee verbalized the challenge response and the style with which the trainee verbalized the challenge response.

15. The method as defined in claim 11, further comprising presenting each key element in bullet form via the second study session user interface.

16. The method as defined in claim 11, further comprising providing for display on the trainee terminal each role model phrase in bullet form.

17. The method as defined in claim 11, further comprising providing for display on the trainee terminal a control, which when activated by the trainee, causes a user interface to be repeated.

18. The method as defined in claim 11, wherein the training subject is related to;

(a) sales, or
(b) service, or
(c) how to relate in a personal situation, or
(d) academic knowledge,
(e) overcoming objections to a course of action, or
(f) proper procedures at a place of employment, or
any combination of (a), (b), (c), (d), (e), or (f).

19. The method as defined in claim 11, wherein one or more user interfaces are served to the trainee terminal by a remote server.

20. The method as defined in claim 11, wherein a complete response to the challenge includes a plurality of elements describing a product or service.

21. A computerized training system comprising non-transitory computer readable memory storing programmatic code, that when executed by a computing device is configured to perform operations comprising:

present via a first study session user interface on a user terminal a challenge, wherein the challenge is to be audibly responded to when delivered by a real or simulated person during a first practice session, the challenge corresponding to a selected training subject and role model phrases including key elements that a user is to be tested on, wherein the challenge and role model phrases are presented as written text and wherein the role model phrases provide a model of a response to the challenge;

textually present via a second study session user interface on the user terminal the challenge and the key elements, wherein the key elements are not embedded in surrounding phrases and are visually separated from one another and wherein the challenge is to be audibly responded to when delivered by the real or simulated person during the first practice session;

present the user, via a first practice session user interface on the user terminal, with the challenge both textually and via a video or animation of the real or simulated person that appears to speak the challenge, wherein the user is to provide a verbal, audible response to the challenge;

after receipt of an indication that the user has audibly responded to the challenge presented delivered by the real or simulated person via the first practice session user interface, present the challenge and the corresponding key elements in at least textual form to the user; and provide navigation controls via which the user can navigate directly between user interfaces, including from the first practice session user interface back to a previously presented study session user interface.

22. The system as defined in claim 21, wherein the programmatic code is further configured to visually emphasize the key elements in the first study session user interface as compared to the phrases in which they are incorporated.

23. The system as defined in claim 21, wherein the programmatic code is further configured to visually separate the role model phrases from each other when presented via the first study session user interface.

24. The system as defined in claim 21, wherein the programmatic code is further configured to present a video or animation of a character that audibly recites the key elements without:

the surrounding phrases, or
the role model phrases including the key elements, or
both the surrounding phrases and the role model phrases including the key elements.

25. The system as defined in claim 21, wherein the person is a simulated customer or prospect.

26. The system as defined in claim 21, wherein the programmatic code is further configured to:

store a first challenge score related to
correctness of the audibly provided user challenge response, or
completeness of the audibly provided user challenge response, or
both the correctness and completeness of the audibly provided user challenge response, wherein the first challenge score is based at least in part on a correspondence of the user challenge response to corresponding key elements presented during the study session.

27. The system as defined in claim 26, wherein the programmatic code is further configured to:

receive and store a second challenge score related to the audibly verbalized user response, wherein the second challenge score is related to how quickly the user initiated the challenge response; and receive and store a third challenge score related to the audibly verbalized user response, wherein the third challenge score is related to:
confidence, or
style,
or both the confidence and style
with which the user verbalized the challenge response.

28. The system as defined in claim 27, wherein the programmatic code is further configured to use a formula to generate a cumulative score using at least the following:

the first challenge score related to:
the correctness of the challenge response, or
completeness of the challenge response,
or both the correctness and completeness of the challenge response;
the second challenge score related to how quickly the user provided the challenge response; and
the third challenge score related to:
the confidence with which the user verbalized the challenge response, or
the style with which the user verbalized the challenge response, or
both the confidence and style with which the user verbalized the challenge response.

29. The system as defined in claim 21, wherein the programmatic code is further configured to present:
each key element; or
each role model phrase, or
both each key element and each role model phrase,
in bullet form.

30. The system as defined in claim 21, wherein the programmatic code is further configured to present a control, which when activated by the user, causes a user interface to be repeated.

31. The system as defined in claim 21, wherein the training subject is related to:
(a) sales, or
(b) service, or
(c) how to relate in a personal situation, or
(d) academic knowledge,
(e) overcoming objections to a course of action, or
(f) proper procedures at a place of employment, or
any combination of (a), (b), (c), (d), (e), or (f).

32. The system as defined in claim 21, further comprising the user terminal, a facilitator terminal used to enter scores, and a server configured to serve one or more user interfaces.

33. The system as defined in claim 21, wherein a complete response to the challenge includes a plurality of elements describing a product or service.

34. A method of providing training using a computerized system, the method comprising:
providing, via the computerized system, for display on a user terminal during a study session a first study session user interface, the first study user interface including a challenge wherein the challenge is to be audibly responded to by a user when delivered by the person during a first practice session, the challenge corresponding to a first training subject and role model phrases including key elements that the user is to be tested on, wherein
the challenge and role model phrases are provided for display as written text, and
the role model phrases provide a model of a response to the challenge;
providing, via the computerized system, for display on the user terminal a second study session user interface, the second study session user interface including the challenge and the key elements in at least text form, wherein the key elements are not embedded in surrounding phrases and are visually separated from one another and wherein the challenge is to be audibly responded to when delivered by the person during the first practice session,
providing, via the computerized system, for display on the user terminal a video or animation of a character audibly reciting at least the key elements;
providing, via the computerized system, for display on the user terminal a first practice session user interface that presents the user with the challenge from a person, wherein the challenge is provided textually and via a video or animation of the person, and wherein the user is to provide a verbal, audible response to the challenge;
after receipt of an electronic indication at the computer system that the user has audibly responded to the challenge presented via the first practice session user interface, providing, via the computerized system, for display on the user terminal the challenge, provided from the person via the first practice session, and the corresponding key elements in at least textual form to the user;
calculating at least one score related to the audibly provided trainee challenge response;
providing the calculated at least one score for display;
providing, via the computerized system, navigation controls via which the user can navigate directly between user interfaces, including from the first practice session user interface back to a previously presented study session user interface;
receiving, at the computerized system, navigation instructions via the navigation controls; and
responding, via the computerized system, to the navigation instructions by providing a corresponding user interface.

35. The method as defined in claim 34, further comprising emphasizing the key elements as compared to the phrases in which they are incorporated via the first study session user interface.

36. The method as defined in claim 34, further comprising visually separating the role model answers from each other when presented via the first study session user interface.

37. The method as defined in claim 34, wherein the step of providing for display on the user terminal the video or animation of a character audibly reciting the key elements is performed without the surrounding phrases being audibly recited.

38. The method as defined in claim 34, wherein the step of providing for display on the user terminal the video or animation of a character audibly reciting the key elements is performed with the surrounding role model phrase, including the key elements, being audibly recited.

39. The method as defined in claim 34, wherein the person is a simulated customer or prospect.

40. The method as defined in claim 34, further comprising:
storing a first challenge score related to:
correctness of the audibly provided user challenge response, or
completeness of the audibly provided user challenge response, or
both the correctness and completeness of the audibly provided user challenge response;
wherein the first challenge score is based at least in part on a correspondence of the user challenge response to corresponding key elements presented during the study session.

41. The method as defined in claim 40, further comprising:
receiving and storing a second challenge score related to the audibly verbalized user response, wherein the second challenge score is related to how quickly the user initiated the challenge response; and
receiving and storing a third challenge score related to the audibly verbalized user response, wherein the third challenge score is related to:
confidence, or
style,
or both the confidence and style,
with which the user verbalized the challenge response.

42. The method as defined in claim 41 further comprising:
generating a cumulative score using at least the following:
the first challenge score related to:
correctness of the challenge response, or
completeness of the challenge response; or
both the correctness of the challenge response and the completeness of the challenge response;
the second challenge score related to how quickly the user provided the challenge response; and the third challenge score related to: the confidence and/or style with which the trainee verbalized the challenge response the confidence with which the trainee verbalized the challenge response, or the style with which the trainee verbalized the challenge response, or both the confidence with which the trainee verbalized the challenge response and the style with which the trainee verbalized the challenge response.

43. The method as defined in claim 34, further comprising presenting:

each key element, or each role model phrase, or both each key element and each role model phrase, in bullet form via the second study session user interface.

44. The method as defined in claim 34, further comprising providing for display on the user terminal a control, which when activated by the user, causes a user interface to be repeated.

45. The method as defined in claim 34, wherein the training subject is related to:

(a) sales, or
(b) service, or
(c) how to relate in a personal situation, or
(d) academic knowledge,
(e) overcoming objections to a course of action, or
(f) proper procedures at a place of employment, or
any combination of (a), (b), (c), (d), (e), or (f).

46. The method as defined in claim 34, wherein one or more of the user interfaces are served to the user terminal by a remote server.

47. The method as defined in claim 34, wherein a complete response to the challenge includes a plurality of elements describing a product or service.

48. The system as defined in claim 1, wherein the programmatic code is further configured to provide a score related to how confidently the trainee verbalized the challenge response.

49. The system as defined in claim 1, wherein the programmatic code is further configured to calculate at least one score related to the audibly provided trainee challenge response and provide the calculated at least one score for display.

50. The system as defined in claim 1, wherein the programmatic code is further configured to calculate a cumulative score based on a plurality of differently weighted scores related to the audibly provided trainee challenge response and provide the calculated cumulative score.

51. The system as defined in claim 1, further comprising an application server, a scenario database, and a user database.

52. The method as defined in claim 11, wherein the at least one score is related to how confidently the trainee verbalized the challenge response.

53. The system as defined in claim 21, wherein the programmatic code is further configured to store and provide a score related to the audibly verbalized user response, wherein the challenge score is related to how confidently the user verbalized the challenge response.

54. The system as defined in claim 21, wherein the programmatic code is further configured to calculate at least one score related to the audibly provided user challenge response and provide the calculated at least one score for display.

55. The system as defined in claim 21, wherein the programmatic code is further configured to calculate a cumulative score based on a plurality of differently weighted scores related to the audibly provided user challenge response and provide the calculated cumulative score for display.

56. The system as defined in claim 21, further comprising an application server, a scenario database, and a user database.

57. The method as defined in claim 34, further comprising storing and providing a score related to the audibly verbalized user response, wherein the score is related to how confidently the user verbalized the challenge response.

* * * * *

UNITED STATES PATENT AND TRADEMARK OFFICE
CERTIFICATE OF CORRECTION

PATENT NO.       : 8,571,463 B2                                          Page 1 of 1
APPLICATION NO.  : 11/669079
DATED            : October 29, 2013
INVENTOR(S)      : Cohen et al.

It is certified that error appears in the above-identified patent and that said Letters Patent is hereby corrected as shown below:

In the Claims

In column 29 at lines 1-3, In Claim 42, after "related to:" delete "the confidence and/or style with which the trainee verbalized the challenge response".

Signed and Sealed this
Thirteenth Day of May, 2014

Michelle K. Lee
*Deputy Director of the United States Patent and Trademark Office*